US007884432B2

(12) United States Patent
Zorich et al.

(10) Patent No.: US 7,884,432 B2
(45) Date of Patent: Feb. 8, 2011

(54) APPARATUS AND METHODS FOR SHIELDING INTEGRATED CIRCUITRY

(75) Inventors: Robert S. Zorich, Costa Mesa, CA (US); Vasiliy K. Borozdin, Costa Mesa, CA (US); Yuliy N. Lieb, Newport Beach, CA (US)

(73) Assignee: Ametek, Inc., Costa Mesa, CA (US)

( * ) Notice: Subject to any disclaimer, the term of this patent is extended or adjusted under 35 U.S.C. 154(b) by 11 days.

(21) Appl. No.: 11/086,788

(22) Filed: Mar. 22, 2005

(65) Prior Publication Data

US 2006/0214202 A1    Sep. 28, 2006

(51) Int. Cl.
    *H01L 29/82* (2006.01)
(52) U.S. Cl. ........................ 257/421; 257/414
(58) Field of Classification Search ............ 257/414, 257/421
    See application file for complete search history.

(56) References Cited

U.S. PATENT DOCUMENTS

| 4,333,349 A | 6/1982 | Mallon et al. |
| 4,490,803 A | 12/1984 | Briggs |
| 4,618,397 A | 10/1986 | Shimizu et al. |
| 4,665,754 A | 5/1987 | Glenn et al. |
| 4,695,817 A | 9/1987 | Kurtz et al. |
| 4,710,744 A | 12/1987 | Wamstad |
| 4,739,298 A | 4/1988 | Kurtz et al. |
| 4,763,098 A | 8/1988 | Glenn et al. |
| 4,788,521 A | 11/1988 | Johnson |
| 4,904,978 A | 2/1990 | Barth et al. |
| 5,013,396 A | 5/1991 | Wise et al. |
| 5,060,526 A | 10/1991 | Barth et al. |
| 5,070,596 A | 12/1991 | Gaul et al. |
| 5,177,661 A | 1/1993 | Zavracky et al. |

(Continued)

FOREIGN PATENT DOCUMENTS

WO    WO 90/13011 A    11/1990

(Continued)

OTHER PUBLICATIONS

An Ultra-Thin Hermetic Package Utilizing Electroplated Gold by Brian H. Stark and Khalil Najafi, Transducers '01 Eurosensors XV The 11$^{th}$ International Conference on Solid-State Sensors and Actuator, Munich, Germany, Jun. 10-14, 2001.

*Primary Examiner*—Long Pham
(74) *Attorney, Agent, or Firm*—Knobbe Martens Olson & Bear LLP

(57) ABSTRACT

Systems and methods are provided for shielding integrated circuits from electromagnetic or electrostatic fields by locating an active device layer between two conductors that are electrically coupled together. In certain embodiments, a sensor comprises a conductive substrate that provides structural support and shielding to circuit elements in a semiconductor device layer. The device layer is between the conductive substrate and a shield layer that are electrically coupled together to create a shield or "Faraday box." In certain embodiments, the device layer is substantially isolated from the conductive substrate and the shield layer by insulative layers. In certain embodiments, an input voltage powers the device layer and is also coupled to the substrate and the shield layer. Thus, the conductive substrate and the shield layer absorb and/or repel electrostatic charges or ions in a medium surrounding the sensor.

15 Claims, 12 Drawing Sheets

U.S. PATENT DOCUMENTS

| | | | |
|---|---|---|---|
| 5,223,444 A | 6/1993 | Mosser et al. |
| 5,231,301 A | 7/1993 | Peterson et al. |
| 5,242,863 A | 9/1993 | Xiang-Zheng et al. |
| 5,286,671 A | 2/1994 | Kurtz et al. |
| 5,343,064 A | 8/1994 | Spangler et al. |
| 5,386,142 A | 1/1995 | Kurtz et al. |
| 5,461,001 A | 10/1995 | Kurtz et al. |
| 5,493,248 A | 2/1996 | Dunn et al. |
| 5,510,645 A | 4/1996 | Fitch et al. |
| 5,549,006 A | 8/1996 | Kurtz |
| 5,589,810 A | 12/1996 | Fung |
| 5,592,009 A | 1/1997 | Hidaka |
| 5,614,678 A | 3/1997 | Kurtz et al. |
| 5,646,072 A | 7/1997 | Maudie et al. |
| 5,686,826 A | 11/1997 | Kurtz et al. |
| 5,702,619 A | 12/1997 | Kurtz et al. |
| 5,705,751 A | 1/1998 | Briefer et al. |
| 5,914,520 A | 6/1999 | Werner |
| 5,955,771 A | 9/1999 | Kurtz et al. |
| 5,973,590 A | 10/1999 | Kurtz et al. |
| 5,999,082 A | 12/1999 | Kurtz et al. |
| 6,012,335 A | 1/2000 | Bashir et al. |
| 6,023,978 A | 2/2000 | Dauenhauer et al. |
| 6,056,888 A | 5/2000 | August |
| 6,133,610 A | 10/2000 | Bolam et al. |
| 6,210,989 B1 | 4/2001 | Kurtz et al. |
| 6,229,427 B1 | 5/2001 | Kurtz et al. |
| 6,235,611 B1 | 5/2001 | Kurtz et al. |
| 6,242,786 B1 | 6/2001 | Wada et al. |
| 6,245,600 B1 | 6/2001 | Geissler et al. |
| 6,249,075 B1 | 6/2001 | Bishop et al. |
| 6,272,928 B1 | 8/2001 | Kurtz |
| 6,293,154 B1 | 9/2001 | Kurtz |
| 6,326,682 B1 | 12/2001 | Kurtz et al. |
| 6,330,829 B1 | 12/2001 | Kurtz et al. |
| 6,363,792 B1 | 4/2002 | Kurtz et al. |
| 6,372,609 B1 | 4/2002 | Aga et al. |
| 6,388,299 B1 | 5/2002 | Kang et al. |
| 6,406,933 B1 | 6/2002 | Aigner et al. |
| 6,410,962 B2 | 6/2002 | Geissler et al. |
| 6,413,793 B1 | 7/2002 | Lin et al. |
| 6,424,017 B2 | 7/2002 | Kurtz et al. |
| 6,429,458 B2 | 8/2002 | Weigold et al. |
| 6,518,084 B1 | 2/2003 | Seitz et al. |
| 6,523,415 B2 | 2/2003 | Kurtz et al. |
| 6,530,282 B1 | 3/2003 | Kurtz et al. |
| 6,543,291 B1 | 4/2003 | Kurtz et al. |
| 6,555,888 B2 | 4/2003 | Lepert et al. |
| 6,577,224 B2 | 6/2003 | Kurtz |
| 6,581,468 B2 | 6/2003 | Clifford |
| 6,584,644 B2 | 7/2003 | Braid et al. |
| 6,588,281 B2 | 7/2003 | Kurtz et al. |
| 6,589,823 B1 | 7/2003 | Beebe et al. |
| 6,591,686 B1 | 7/2003 | Kurtz |
| 6,595,066 B1 | 7/2003 | Kutz et al. |
| 6,601,455 B2 | 8/2003 | Kurtz et al. |
| 6,612,179 B1 | 9/2003 | Kurtz |
| 6,612,180 B1 | 9/2003 | Kurtz |
| 6,686,546 B2 | 2/2004 | Chiu |
| 6,688,584 B2 | 2/2004 | Iyer et al. |
| 6,696,369 B2 | 2/2004 | Fraser et al. |
| 6,700,473 B2 | 3/2004 | Kurtz et al. |
| 6,718,830 B1 | 4/2004 | Johnson |
| 6,740,945 B2 | 5/2004 | Lepert et al. |
| 6,813,956 B2 | 11/2004 | Kurtz et al. |
| 6,870,236 B2 | 3/2005 | Johnson |
| 6,877,379 B2 | 4/2005 | Kurtz et al. |

FOREIGN PATENT DOCUMENTS

| | | | |
|---|---|---|---|
| WO | WO 03/106329 A2 | 12/2003 | |

APPARATUS AND METHODS FOR SHIELDING INTEGRATED CIRCUITRY

BACKGROUND OF THE INVENTION

1. Field of the Invention

The present invention relates to integrated circuits, and more particularly to electromagnetically shielded silicon-on-insulator (SOI) sensors and similar electronic devices.

2. Description of the Related Art

Integrated circuits generally comprise electronic devices and electrical interconnections formed in or on a thin layer of semiconductor material. Electromagnetic and electrostatic fields affect the performance of the electronic devices. For example, nearby circuitry can generate an electric field in the integrated circuit and can move free electrons across the active semiconductor layer. This electric field changes charge distribution in the semiconductor material that varies as the strength of the electric field changes.

A silicon-on-insulator (SOI) device includes an active semiconductor layer, such as silicon or the like, over an insulator layer. Generally, the insulator layer comprises a buried oxide (BOX) region of a substrate which provides structural support to the device. The BOX region is generally formed below a top surface of the substrate, and the active semiconductor layer is formed over the BOX region. The active semiconductor layer includes circuit elements such as resistors, transistors, diodes, or the like. The performance of the circuit elements formed in the active semiconductor layer can be affected by electromagnetic or electrostatic fields.

SOI devices can operate at high temperatures and are used to create high-speed integrated circuits and sensors to measure, for example, pressure, acceleration, temperature, or the like. An SOI sensor that measures mechanical displacement includes a piezoresistive strain gauge formed in the active semiconductor layer which is isolated from the underlying substrate by the insulation layer. Generally, the active semiconductor layer comprises doped monocrystalline silicon, polycrystalline silicon, germanium, or composite III-V class semiconductors. The SOI sensor also has a flexible substrate and the resistance of the strain gauge varies with mechanical displacement of the flexible substrate as pressure or force on the SOI sensor causes small mechanical deformations that stretch or compress the active semiconductor layer.

The strain gauge may include, for example, a network of resistors in a bridge circuit. Pressure variation changes the resistances of the bridge circuit by mechanically deforming the SOI sensor, enabling the resistors of the bridge circuit to generate a differential voltage across the bridge proportional to the measured pressure. The accuracy of pressure measurements is affected by the stability of the resistor values as a function of flexing the crystal grid of the active semiconductor material.

Factors such as high temperatures, electromagnetic interference, or strong static fields can affect the piezoelectric resistor values or other circuitry and introduce error into the pressure measurements. For example, the presence of stray electric fields induces field effects in the active semiconductor material that effectively create channels that allow current to flow more easily (reducing resistivity) or that pinch off the current (increasing resistivity) as the fields change. In some applications, oil with a high dielectric value is used to isolate the SOI device from a hostile environment, such as inside an engine or fuel tank. Generally, such oils exhibit a dipole moment when heated. The dipoles of the oil produce an electric field potential in close proximity to the circuit elements in the active semiconductor layer which causes drift currents resulting in measurement error. Other SOI devices used in systems which generate stray electric fields or static buildup within the SOI device itself or within its packaging may also suffer from such error.

SUMMARY OF THE INVENTION

In certain embodiments, an electronic device includes a conductive substrate, a first insulative layer over at least a portion of the substrate, a device layer over the first insulative layer, a second insulative layer over the device layer, and a conductive shield layer over the second insulative layer. The shield layer is electrically coupled to the substrate.

In certain embodiments, a pressure sensor includes a conductively-doped silicon substrate. The substrate comprises a flexible diaphragm. The pressure sensor also includes a buried silicon oxide layer below a top surface of the substrate and a device layer over the buried silicon oxide layer. The device layer is electrically responsive to flexing of the diaphragm. The pressure sensor further includes an insulative layer over the device layer, a conductive shield layer over the insulative layer, and an electrical conduit which electrically couples the shield layer to the silicon substrate below the buried silicon oxide layer.

In certain embodiments, a method of forming an electronic device includes providing a semiconductor and forming a first insulative layer over at least a portion of the semiconductor. The method also includes forming a device layer over the first insulative layer and forming a second insulative layer over the device layer. A conductive shield layer is formed over the second insulative layer. The method also includes electrically coupling the shield layer to the semiconductor.

In certain embodiments, a method of sensing a pressure differential includes providing a device comprising a housing for at least partially enclosing a conductive substrate. The conductive substrate comprises a flexible diaphragm having first and second sides and a conductive shield layer positioned over the substrate. The shield layer is electrically coupled to the substrate. The conductive substrate further comprises a device layer positioned between the substrate and the shield layer. The device layer is electrically responsive to flexing of the diaphragm and the first side of the diaphragm is exposed to a first pressure. The method also includes exposing the second side of the diaphragm to a second pressure different from the first pressure so as to define a pressure differential that causes flexing of the diaphragm. The method further includes sensing the electrical response of the device layer to the flexing.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Exemplary systems and methods which embody various embodiments of the invention will now be described with reference to the following drawings.

DETAILED DESCRIPTION OF EXEMPLARY EMBODIMENTS

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present disclosure. The present disclosure, however, may be practiced without the specific details or with certain alternative equivalent components and methods to those described herein. In other instances, well-known components and methods have not been described in detail so as not to unnecessarily obscure aspects of the present disclosure.

Figure 1A:
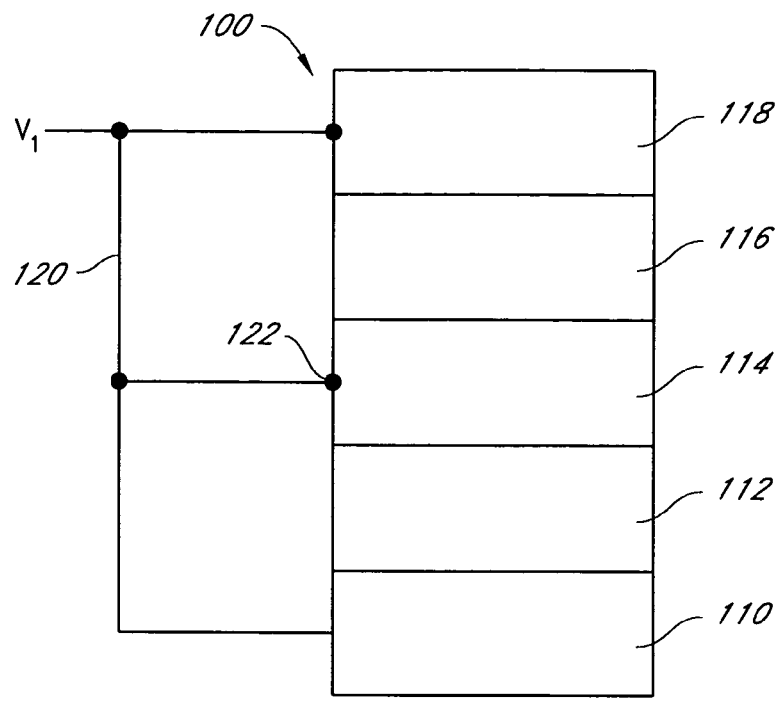
FIGS. 1A and 1B are block diagrams of a shielded electronic device according to certain embodiments of the invention described herein.
Figure 1B:
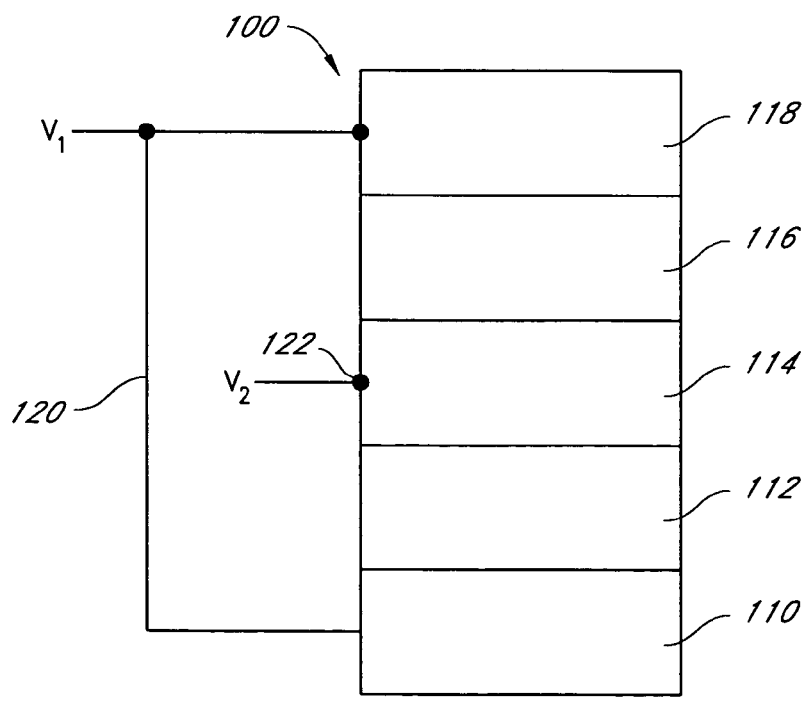

FIGS. 1A and 1B are block diagrams of a shielded electronic device 100 according to certain embodiments of the invention described herein. The electronic device 100 comprises a conductive substrate 110, a first insulative layer 112 over at least a portion of the conductive substrate 110, a device layer 114 over the first insulative layer 112, a second insulative layer 116 over the device layer 114, and a conductive shield layer 118 over the second insulative layer 116. The shield layer 118 is electrically coupled to the conductive substrate 110 and to a common point of contact on the device layer 114.

Exemplary materials for the conductive substrate 110 include, but are not limited to, conductive metals, transition metals, conductive polymers, and doped semiconductor materials (e.g., amorphous, single crystal, polycrystalline or composite semiconductors) such as Si, GaAs, InP, Ge, SiGe, SiC, InAs, or the like. The conductive substrate 110 of certain embodiments comprises p-type or n-type doped silicon with a resistivity in a range between approximately 1 ohm-cm and approximately 22 ohms-cm. In other embodiments, the resistivity of the conductive substrate 110 is in a range between approximately 15 ohms-cm and approximately 20 ohms-cm. In yet other embodiments, the resistivity of the conductive substrate 110 is in a range between approximately 5 ohms-cm and approximately 10 ohms-cm.

The first insulative layer 112 of certain embodiments comprises a dielectric material. Exemplary dielectric materials include, but are not limited to, silicon dioxide, silicon nitride, silicon oxy-nitride, silicon carbide, alumina, or other ceramic or polymeric dielectrics. The dielectric material of the first insulative layer 112 is selected in certain embodiments to provide co-adhesion to the conductive substrate 110 and to the device layer 114, and to provide dielectric isolation with low defects and no electrical short paths from the device layer 114 to the conductive substrate 110.

In certain embodiments, the thickness of the first insulative layer 112 is in a range between approximately 3600 angstroms and approximately 4400 angstroms. Other embodiments have a first insulative layer 112 thickness less than 3600 angstroms and still other embodiments have a first insulative thickness greater than 4400 angstroms. Indeed, in certain embodiments, operation of the shielded electronic device 100 depends more on repeatability and accurate characterization of the thickness of the first insulative layer 112 than on the thickness. The thickness of the first insulative layer 112 is selected based on various factors including, but not limited to, the type of circuit elements formed in the device layer 114. Generally, the thicker the first insulative layer 112, the higher the isolation resistance between the conductive substrate 110 and the device layer 114.

In certain embodiments wherein the conductive substrate 110 comprises a doped semiconductor, the first insulative layer 112 is fabricated using a separation by implantation of oxygen (SIMOX) technique. In certain embodiments, oxygen is implanted a preselected distance below a top surface of the conductive substrate 110 to form a buried oxide layer. The buried oxide layer in the first insulative layer 112, and the silicon above the buried oxide layer is used to form the device layer 114.

In certain other embodiments, the conductive substrate 110, the first insulative layer 112, and the device layer 114 are fabricated through an electromechanical bonding process. In certain such embodiments, a first silicon wafer comprises the conductive substrate 110 and a second silicon wafer comprises. The first insulative layer 112 comprises a silicon oxide layer thermally grown on the first silicon wafer. In certain such embodiments, the silicon oxide layer is approximately 4000 angstroms thick.

After growing the silicon oxide layer on the first silicon wafer, the second silicon wafer is bonded (e.g., using fusion, anodic bonding, or other bonding procedures known in the art) to the silicon oxide layer to form a bonded wafer. Hydrogen ions or rare gas ions are then implanted a predetermined distance below the surface of the second silicon wafer to form an enclosed layer or bubble layer at a depth below the surface of the second silicon wafer corresponding to the mean penetration depth of ion implantation. In certain embodiments, the bubble layer is formed approximately 3400 angstroms above the silicon oxide layer. The bonded wafer is then annealed to cause crystal rearrangement to remove defects due to the implantation. The annealing step also causes bubble cohesion, and the resultant bubble layer allows delamination of excess material from the second silicon wafer to the approximate depth of the bubble layer.

An artisan will recognize from the disclosure herein that the silicon oxide layer may be thermally grown on the second silicon wafer instead of the first silicon wafer. In certain such embodiments, the silicon oxide layer is then bonded to the first silicon wafer and the process continued as described above. An artisan will also recognize that the excess material may be removed from the second silicon wafer by polishing, etching or cutting. Further examples of ion delamination processes usable to form the conductive substrate 110, the first insulative layer 112, and the device layer 114 are provided in U.S. Pat. No. 6,372,609 to Aga et al., which is hereby incorporated by reference herein.

The device layer 114 of certain embodiments comprises circuit elements (not shown) such as one or more resistors, transistors, diodes, conductive lines, contacts and other circuitry. The device layer 114 of certain embodiments comprises one or more materials selected for their ability to conduct electricity, and to bond to the first insulative layer 112 and the second insulative layer 116.

In some embodiments, the thickness of the device layer 114 is in a range between approximately 200 nanometers and approximately 2000 nanometers. Other embodiments have device layer 114 thicknesses greater than 2000 nanometers. In certain embodiments in which solid source diffusion is used to form the device layer 114, the thickness of the device layer 114 is in a range between approximately 3200 angstroms and approximately 3600 angstroms. Other embodiments have a device layer 114 thickness less than 3200 angstroms and still other embodiments have a device layer 114 thickness greater than 3600 angstroms. Indeed, in certain embodiments, operation of the shielded electronic device 100 depends more on repeatability and accurate characterization of the thickness of the device layer 114 than on the thickness itself.

In certain embodiments, the device layer 114 may be doped using ion implantation, liquid source diffusion or solid source diffusion to form an n-type or p-type layer using suitable dopants. For example, boron may be used for a device layer 114 comprising p-type silicon. Alternatively, phosphorous or arsenic may be used, for example, as the dopant for a device layer 114 comprising n-type silicon.

In certain embodiments in which two silicon wafers are anodically bonded together to form the electronic device 100, the device layer 114 is anodically bonded to the first insulative layer 112. In other embodiments, the first insulative layer 112 is anodically bonded to the conductive substrate 110. The silicon layer above the first insulative layer 112 is doped (e.g., by ion implantation, liquid source diffusion or solid source diffusion) to form the device layer 114 in certain embodiments. In certain other embodiments, the device layer 114 is epitaxially grown or deposited on the surface of the first insulative layer 112. For example, the device layer 114 may be formed using thermal growing techniques or conventional deposition processes such as chemical vapor deposition (CVD), sputtering, electroplating, spray-on techniques, or spin-on techniques. An artisan will recognize from the disclosure herein that the device layer 114 may comprise other doped semiconductor materials such as Si, GaAs, InP, SiGe, Ge, or the like.

The second insulative layer 116 in certain embodiments comprises a dielectric material over the device layer 114. Exemplary dielectric materials for the second insulative layer 116 include, but are not limited to, silicon dioxide, doped silicon dioxide, silicon monoxide, silicon nitride, silicon oxynitride, fused quartz, silicon carbide, alumina, or other ceramic dielectrics or polymeric dielectrics. The second insulative layer 116 of certain embodiments adheres to the conductive shield layer 118 and the device layer 114. The material of the second insulative layer 116 is selected based on various factors such as high dielectric breakdown, good dielectric properties, good thermal resistance, and thermal conductivity and thermal expansion coefficients that substantially match the thermal conductivity and thermal expansion coefficients of the device layer 114. For example, in certain embodiments, the thermal expansion coefficient of the second insulative layer 116 is within approximately 25% of the thermal expansion coefficient of the device layer 114. In certain such embodiments, the device layer 114 comprises silicon having a thermal expansion coefficient of approximately $3 \times 10^{-6}/°$ C. and the second insulative layer 116 comprises glass such as Pyrex® code 7740 borosilicate glass having a thermal expansion coefficient of approximately $2.6 \times 10^{-6}/°$ C.

The second insulative layer 116 provides insulation between the device layer 114 and the shield layer 118. In certain embodiments, the thickness of the second insulative layer 116 is selected to reduce or prevent damage to the shielded electronic device 100 for its expected operation. For example, in certain embodiments, the second insulative layer 116 comprises a brittle insulative material such as silicon dioxide. If the second insulative layer 116 is too thick, it can crack at the edges when subjected to operating stresses. In certain embodiments, the second insulative layer 116 has a thickness in a range between approximately 3000 angstroms and approximately 8000 angstroms. In certain other embodiments, the thickness of the second insulative layer 116 is in a range between approximately 4800 angstroms and approximately 5200 angstroms.

The conductive shield layer 118 according to certain embodiments comprises a conductive film over the second insulative layer 116 so as to substantially cover electrically conductive elements in the device layer 114. In certain embodiments, the conductive shield layer 118 comprises a layer of titanium-tungsten alloy that is approximately 1000 angstroms thick. In certain other embodiments, the conductive shield layer 118 comprises doped polycrystalline silicon, titanium nitride, molybdenum, or SiCr. However, the shield layer 118 of certain embodiments comprises other conductors such as metals, metal alloys, polymeric materials, or other materials that are suitably and substantially conductive. The material of the conductive shield layer 118 is selected based on various factors such as high dielectric breakdown, good dielectric properties, good thermal resistance, and thermal conductivity and thermal expansion coefficients that substantially match the thermal conductivity and thermal expansion coefficients of the second insulative layer 116. Although not shown in FIGS. 1A and 1B, the shielded electronic device 100 according to certain embodiments further comprises a non-oxidizing passivation layer over the conductive shield layer 118 to prevent or reduce oxidization of the conductive shield layer 118. In certain such embodiments, the passivation layer comprises a metal nitride such as titanium nitride, tantalum nitride, or the like.

As schematically illustrated in FIGS. 1A and 1B, the conductive substrate 110 and the conductive shield layer 118 are electrically coupled to one another and to a first voltage VI through a conductive path 120. Thus, the conductive substrate 110 and the conductive shield layer 118 of certain embodiments are configured as a shield or "Faraday box" that provides a stable electric field topography between the conductive substrate 110 and the conductive shield layer 118 such that equipotential lines are substantially flat across the electronic device 100. Certain such embodiments advantageously reduce the interaction of stray electromagnetic fields with the device layer 114.

In certain embodiments, the shield created by the conductive substrate 110 and the conductive shield layer 118 advantageously stabilizes surface charges in the electronic device 100 and reduces the buildup of static potential. The shield of certain embodiments repels and/or discharges dipoles and ions in the environment surrounding the electronic device 110. The shield of certain embodiments also reduces the buildup of electrostatic potential in a medium surrounding the electronic device 100 by allowing charges to flow into the first voltage $V_1$.

In the embodiment schematically shown in FIG. 1A, an input 122 of the device layer 114 is electrically coupled to the conductive substrate 110, the conductive shield layer 118 and the first voltage $V_1$ through the conductive path 120. In certain embodiments, the first voltage $V_1$ provides power to the electrical circuits of the device layer 114. In certain such embodiments, powering the electronic device 100 with the first voltage $V_1$ advantageously reduces the number of input pins used to provide electrical connection to the electronic device 100. In certain other such embodiments, applying the same voltage to the device layer 114, the conductive substrate 110, and the shield layer 118 evenly distributes the equipotential lines in the electronic device 100.

In the embodiment schematically shown in FIG. 1B, the input 122 of the device layer 114 is electrically coupled to a second voltage $V_2$. In certain such embodiments, the first voltage $V_1$ is at a higher potential than the second voltage $V_2$. Such embodiments advantageously compress the equipotential lines in the electronic device 100. Thus, by tightly controlling variations in potential and intensity of the first voltage $V_1$ and the second voltage $V_2$, stray currents that can cause electrical output variations are reduced.

In certain embodiments, the electronic device 100 comprises a sensor such as a pressure transducer, an accelerometer, angle of attack meter, a vibration monitor, a torque sensor, an engine condition monitor, an atmospheric condition monitor, and the like. In addition, or in other embodiments, the circuitry protected between the conductive substrate 110 and the conductive shield layer 118 may include, for example, control and calibration circuits, temperature compensation circuits, zero drift monitoring circuits, and any other analog circuit.

Figure 2A:
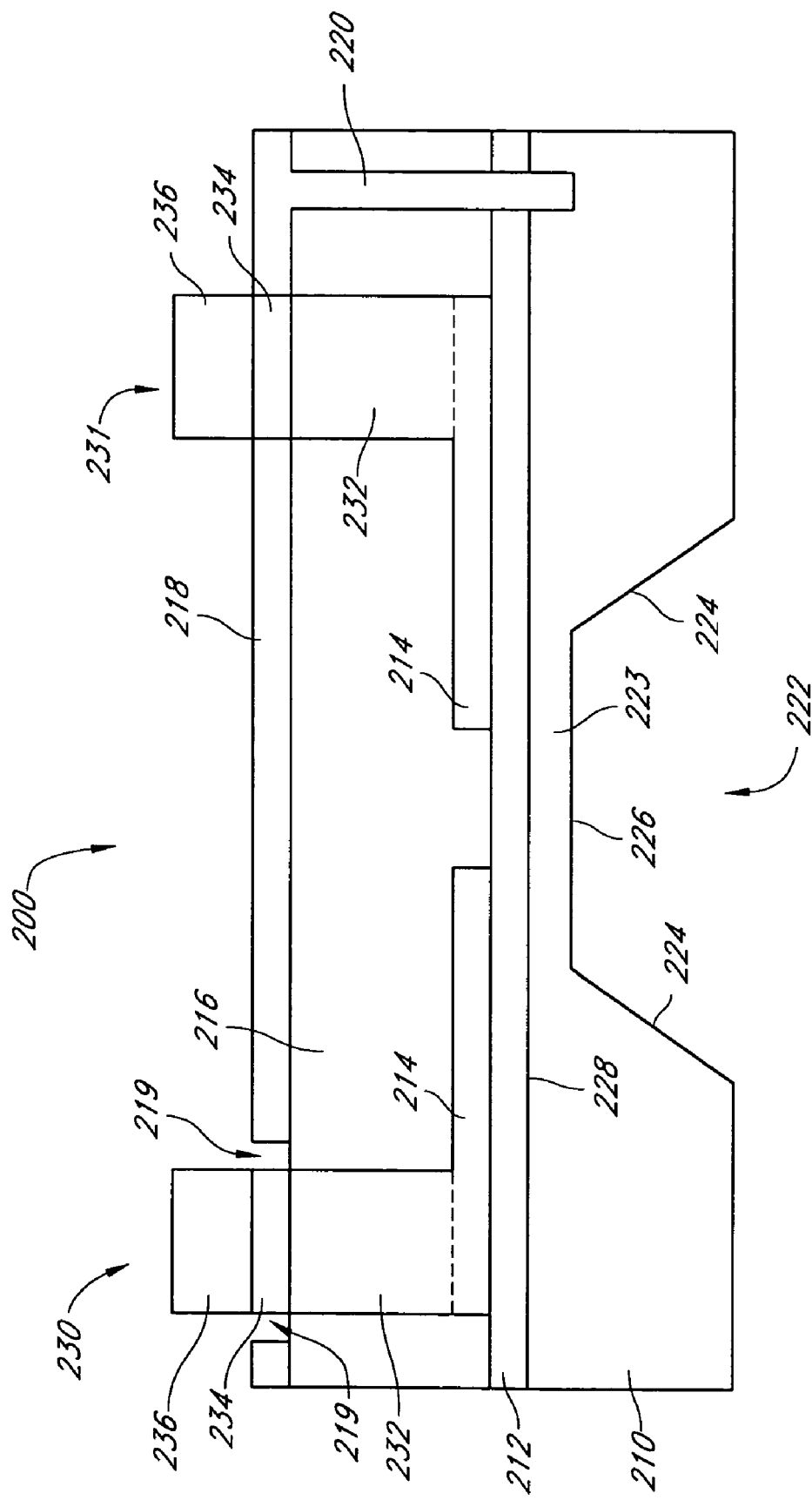
FIGS. 2A and 2B are schematic cross-sectional views of an SOI pressure sensor according to certain embodiments of the invention described herein.
Figure 2B:
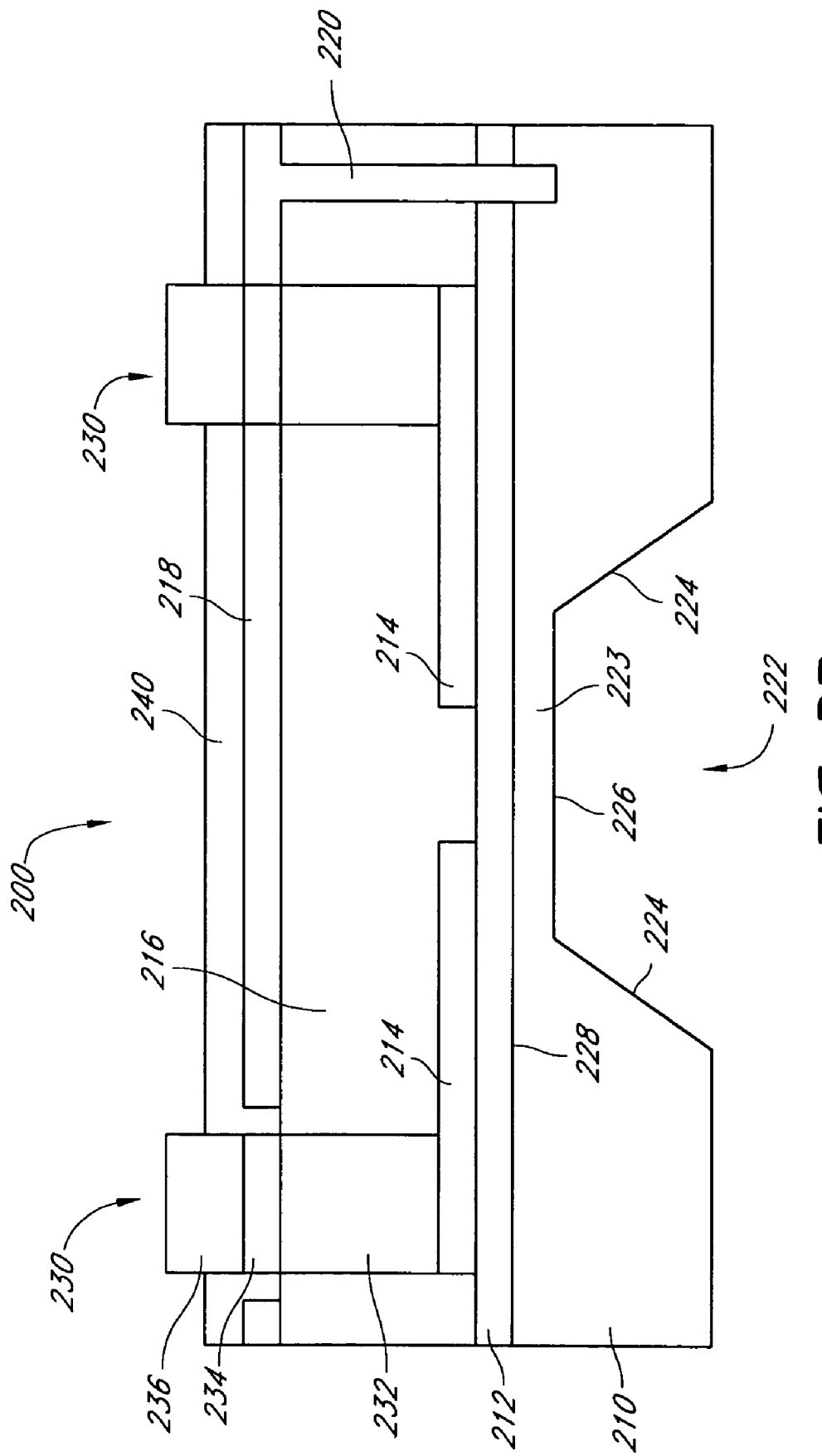

FIGS. 2A and 2B are schematic cross-sectional views of a pressure sensor 200 according to certain embodiments described herein. The pressure sensor 200 comprises a conductive substrate 210, a buried oxide layer 212 over the conductive substrate 210, a device layer 214 over the buried oxide layer 212, an insulative layer 216 over the device layer 214, and a conductive shield layer 218 over the insulative layer 216. The pressure sensor 200 further comprises an electrical conduit 220 which electrically couples the shield layer 218 to the conductive substrate 210 below the buried oxide layer 210. FIG. 2B schematically illustrates an exemplary pressure sensor 200 similar to the one of FIG. 2A, except with the addition of a protective layer 240 over the shield layer 218.

Exemplary materials for the conductive substrate 210 include, but are not limited to, conductive metals, transition metals, conductive polymers, and doped semiconductor materials (e.g., amorphous, single crystal, or composite semiconductor) such as Si, GaAs, InP, Ge, SiGe, SiC, InAs, or the like. Silicon provides good structural stability, controlled conductivity, the ability to be chemically or mechanically milled to a precise thickness, and the ability to maintain the buried oxide layer 212 on its surface with an adequate adhesion, whether the buried oxide layer 212 is thermally grown, deposited, implanted or bonded to the conductive substrate 210. The conductive substrate 210 of certain embodiments comprises p-type or n-type doped silicon so as to be sufficiently conductive without introducing strain. In certain embodiments, the resistivity of the conductive substrate 210 is in a range between approximately 1 ohm-cm and approximately 35 ohms-cm. In other embodiments, the resistivity of the conductive substrate 210 is in a range between approximately 15 ohms-cm and approximately 20 ohms-cm. In yet other embodiments, the resistivity of the conductive substrate 210 is in a range between approximately 5 ohms-cm and approximately 10 ohms-cm.

The conductive substrate 210 of certain embodiments comprises a thinned or cut-out region 222 as schematically illustrated by FIGS. 2A and 2B. The cut-out region 222 defines a flexible diaphragm 223 in the remaining portion of the conductive substrate 210. In certain embodiments, the diaphragm 223 is approximately centrally located in the pressure sensor 200. The diaphragm 223 flexes when pressure or force is applied to the sensor 200. The physical parameters of the diaphragm 223 (e.g., materials, thickness) affect how much the diaphragm 223 flexes when pressure is applied, which in turn affects the output range of the sensor 200. Generally, the sensitivity of the sensor 200 decreases as the thickness of the diaphragm 223 increases. In some embodiments, the thickness of the diaphragm 223 is in a range between approximately 5 microns and approximately 50 microns. In other embodiments, the diaphragm 223 has a thickness in a range between approximately 20 microns and approximately 275 microns. In further embodiments, the diaphragm 223 has a thickness in a range between approximately 275 microns and substantially more than 300 microns.

The cut-out region 222 includes sidewalls 224 that in certain embodiments have characteristic slopes that affect the amount of flexure of the diaphragm 223. In certain embodiments, at least a portion of the sidewalls 224 are located under flexure-responsive elements (not shown) in the device layer 214 such that the flexure-responsive elements are modified (e.g., stretched and/or compressed) when the diaphragm 223 flexes. In certain embodiments, the flexure-responsive elements of the device layer 214 comprise a network of piezoresistors in a Wheatstone bridge configuration. The resistivity of a piezoresistor changes as it is compressed or stretched by applying forces. The piezoresistors of certain embodiments comprise tensile sensors, compression sensors, or both, and are located over portions of the diaphragm 223 which experience substantial flexing, such as over an edge of the cut-out region 222 (i.e., approximately over the intersection of a sidewall 224 and the horizontal surface 226).

As schematically shown in FIGS. 2A and 2B, in certain embodiments, the sidewalls 224 and a bottom surface 226 of the cut-out region 222 are substantially linear. Further, the bottom surface 226 is substantially parallel to a bottom surface 228 of the buried oxide layer 212. However, in other embodiments, the cut-out region 222 may comprise other geometrical shapes.

In certain embodiments, a thin membrane (not shown) that exhibits a predictable flexure for a given pressure is attached (e.g., by anodic bonding or fusion bonding) over the cut-out region 222 of the conductive substrate 210. In certain such embodiments, the membrane serves as part of the diaphragm 223. Rather than etching the diaphragm 223 from the conductive substrate 210, in certain embodiments, a hole is formed in the conductive substrate 210 and the thin membrane (not shown) is bonded over the hole to the conductive substrate 210. In certain such embodiments, the membrane serves as the diaphragm 323. For example, the membrane may comprise a flexible material, including but not limited to, metals, metal alloys, polymeric materials, ceramics, glasses, or other flexible materials.

The buried oxide layer 212 of certain embodiments provides electrical isolation between the conductive substrate 210 and circuitry formed in the device layer 214. Exemplary materials for the buried oxide layer 212 include, but are not limited to, silicon dioxide, silicon nitride, silicon oxy-nitride, silicon carbide, alumina, or other ceramic or polymeric dielectrics. The dielectric material of the buried oxide layer 212 is selected in certain embodiments to provide co-adhesion to the conductive substrate 210 and to the device layer 214, to provide dielectric isolation with low defects and no electrical short paths from the device layer 214 to the conductive substrate 210, and to be substantially flat across the cut-out region 222.

In certain embodiments, the thickness of the buried oxide layer 212 is in a range between a few hundred angstroms and several microns. In certain embodiments, the thickness of the device layer 214 is in a range between approximately 200 nanometers and approximately 2000 nanometers. In certain other embodiments, the thickness of the device layer 214 is in a range between approximately 100 nanometers and approximately 500 nanometers. Other embodiments have device layer 214 thicknesses greater than 2000 nanometers. The thickness of the buried oxide layer 212 is selected based on various factors including, but not limited to, the type of circuit elements formed in the device layer 214 and the range of the sensor 200. Generally, the thicker the buried oxide layer 212, the higher the isolation resistance between the conductive substrate 210 and the device layer 214. However, the sensitivity of the pressure sensor 200 generally decreases as the thickness of the buried oxide layer 212 increases.

The device layer 214 of certain embodiments comprises one or more materials selected for their ability to conduct electricity, to bond to the buried oxide layer 212, and to provide a response to flexure of the diaphragm 223. For example, in certain embodiments, the device layer 214 comprises a substantially homogenous film comprising doped silicon. In certain other embodiments, the device layer 214 comprises one or more other doped semiconductor materials including, but not limited to, GaAs, InP, SiGe, Ge, and the like. In certain embodiments, the device layer 214 comprises n-type and/or p-type semiconductor circuits including, for example, one or more resistors, capacitors, transistors, diodes, other circuitry. The device layer 214 of certain embodiments comprises conductive metal layers which provide electrical interconnections between the circuit elements of the device layer 214.

The insulative layer 216 in certain embodiments provides insulation between the device layer 214 and the shield layer 218. In certain embodiments, the thickness of the insulative layer 216 is in a range between a few hundred angstroms and several microns. In certain other embodiments, the thickness of the insulative layer 216 is in a range between approximately 100 nanometers and approximately 500 nanometers. The thickness in certain embodiments is determined, at least in part, by the effect of the insulative layer 216 on various characteristics of the sensor 200 including, for example, drift, sensor pre-loading, and sensitivity. Exemplary dielectric materials for the insulative layer 216 include, but are not limited to, silicon dioxide, doped silicon dioxide, silicon monoxide, silicon nitride, silicon oxynitride, aluminum silicon oxynitride, fused quartz, silicon carbide, alumina, boron nitride, low-k dielectrics, tantalum oxide and other high-k dielectrics, fluorocarbon polymer, plastic, ceramic, glass, or other ceramic dielectrics or polymeric dielectrics.

The insulative layer 216 advantageously adheres to the shield layer 218 and to the device layer 214. In certain embodiments, portions of the insulative layer 216 also adhere to the buried oxide layer 212, as schematically shown in FIGS. 2A and 2B. In certain embodiments, the material of the insulative layer 216 is selected based on factors such as high dielectric breakdown, good dielectric properties, good thermal resistance, and thermal conductivity and thermal expansion coefficients that substantially match the thermal conductivity and thermal expansion coefficients of the device layer 214. For example, in certain embodiments, the thermal expansion coefficient of the insulative layer 216 is within approximately 25% of the thermal expansion coefficient of the conductive substrate 210.

In certain embodiments, the pressure sensor 200 further comprises a first interconnect stack 230 and a second interconnect stack 231 which provide external electrical connections to the circuit elements in the device layer 214. As schematically illustrated in FIG. 2A, the shield layer 218 of certain embodiments is electrically isolated from the first interconnect stack 230 and is electrically coupled to the second interconnect stack 231. The interconnect stacks 230, 231 in certain embodiments comprise a first conductive film 232, a second conductive film 234, and a third conductive film 236. In certain embodiments, the first conductive film 232 comprises doped silicon, the second conductive film 234 comprises a titanium-tungsten alloy, and the third conductive film 236 comprises gold. In other embodiments, the third conductive film 236 comprises aluminum, copper, aluminum-copper alloy, gold, or another conductive material suitable for use as an electrical contact.

In certain other embodiments, the first conductive film 232 comprises a titanium-tungsten plug deposited on a contact pad of the device layer 214. The second conductive film 234 also comprises titanium-tungsten alloy and forms at least a portion of the shield layer 218 deposited over the first conductive film 232. The third conductive film 236 comprises a gold wire interconnect contact.

In certain other embodiments, the interconnect stacks 230, 231 comprise other conductive materials selected based on factors such as forming good junctions, exhibiting good adhesion, and exhibiting insensitivity to electromigration. Exemplary materials for the interconnect stacks 230, 231 include, but are not limited to, metals, transition metals, doped semiconductors, and alloys of multiple metals. In other certain embodiments, the interconnect stacks 230, 231 comprise composite materials that include metals, refractory metals, multiple metal alloys, doped semiconductors, composite films, conductive polymer films, conductive materials such as TiN, or the like.

An artisan will recognize from the disclosure herein that the interconnect stacks 230, 231 are not limited to three layers of conductive films 232, 234, 236, and may comprise a single conductive material or many conductive film layers. For example, in certain embodiments, at least one of the interconnect stacks 230, 231 comprises several conductive films that can be easily deposited and etched such as doped conductive silicon, silicon-platinum silicide, titanium, titanium nitride, titanium-tungsten alloy, and gold. In certain such embodiments, aluminum or other conductive metals replace or are used in addition to the gold.

The shield layer 218 of certain embodiments comprises a conductive film over the insulative layer 216 so as to substantially cover the electrically conductive elements of the device layer 214. In certain embodiments, the thickness of the shield layer 218 is selected based at least in part on design factors such as increasing the sensitivity of the sensor 200 and reducing hysteresis. In certain embodiments, the shield layer 218 comprises a layer of titanium-tungsten alloy that is in a range between approximately 500 angstroms and 2000 angstroms thick. In certain other embodiments, the shield layer 218 comprises titanium nitride, molybdenum, or SiCr.

In certain embodiments, the shield layer 218 has a coefficient of thermal expansion similar to that of silicon, (e.g., below approximately 10 ppm/° C.) so as to reduce the amount of strain induced by the shield layer 218 in the pressure sensor 200 during thermal cycles. The shield layer 218 in certain embodiments also has a relatively low resistance, for example, under approximately 1 Megaohm. Exemplary materials for the shield layer 218 include, but are not limited to doped and undoped semiconductors such as Si, Ge, SiGe, GaAs, InP, or other class IV materials or composite III-V or II-VI class materials. In certain embodiments, the shield layer 218 also comprises conductive materials such as titanium, tantalum, tantalum nitride, titanium-tungsten alloy, gold, copper, titanium nitride, platinum silicide, or a combination of two or more of the foregoing. Other exemplary materials include, but are not limited to, metals, refractory metals, metal alloys, conductive composite materials, conductive polymers, or other materials that are suitably and substantially conductive.

In certain embodiments, the thickness of the shield layer 218 is in a range between approximately 500 angstroms and approximately 1000 angstroms. The shield layer 218 of certain embodiments is sufficiently thin so as to reduce or minimize its effect on the flexure of the diaphragm 223 to external pressures. In certain such embodiments, the shield layer 218 is configured to allow the pressure sensor 200 to flex when a force or pressure is applied to the shield layer 218, the conductive substrate 210, or both.

In certain embodiments, the shield layer 218 is substantially contiguous without patterns etched into it except in regions 219 where electrical isolation from the first interconnect stack 230 is desired, as schematically illustrated in FIGS. 2A and 2B. In certain other embodiments, the shield layer 218 comprises a plurality of sections, with each section covering one or more piezoresistors and associated conductive lines or other circuitry in the device layer 214. For example, in certain embodiments wherein the device layer 214 comprises a Wheatstone bridge network including four piezoresistors, the shield layer 218 can be divided into quadrants, with each quadrant covering one of the piezoresistors and its associated conductive lines.

Figure 6A:
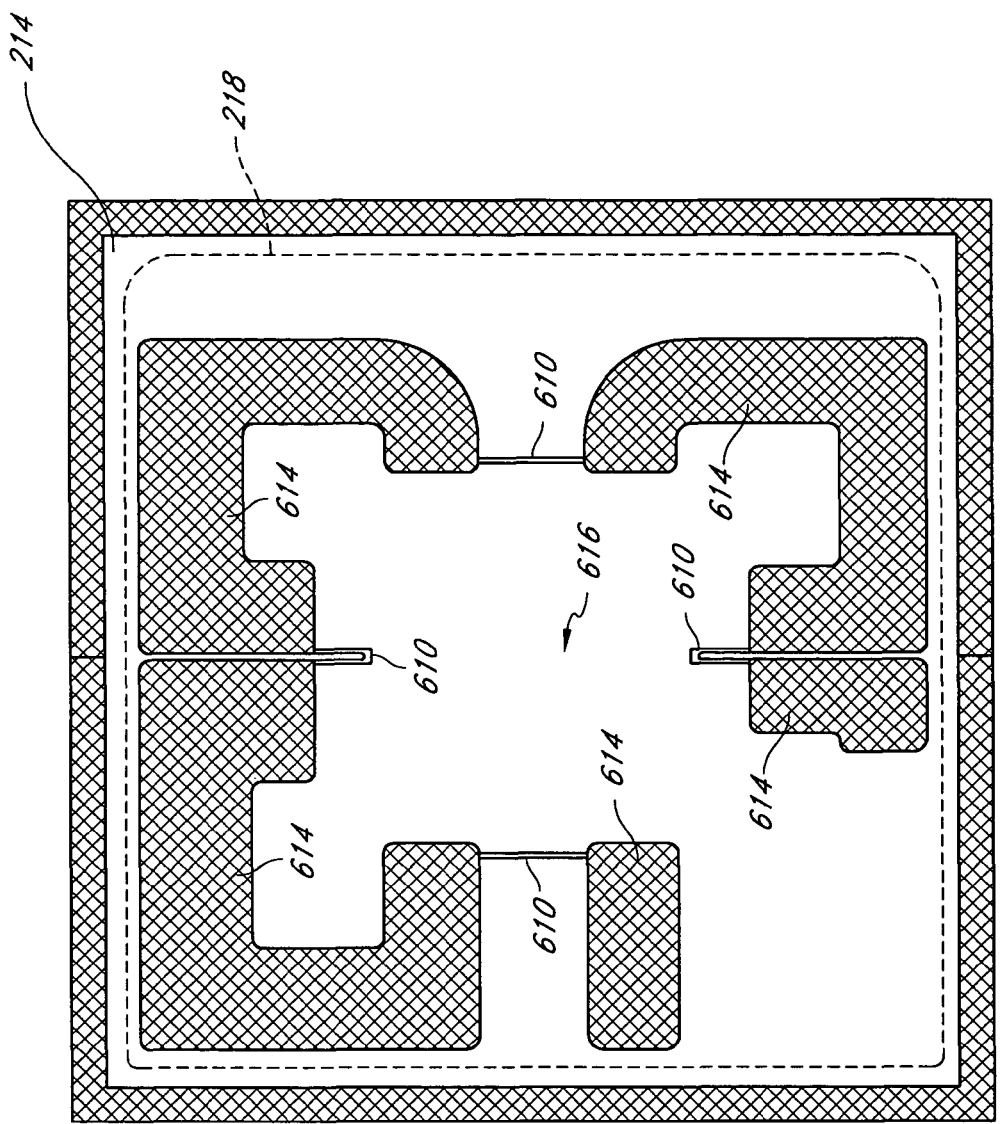
FIGS. 6A-6C are schematic diagrams illustrating a top view of an exemplary device layer in relation to various configurations of a shield layer according to certain embodiments of the invention described herein.
Figure 6B:
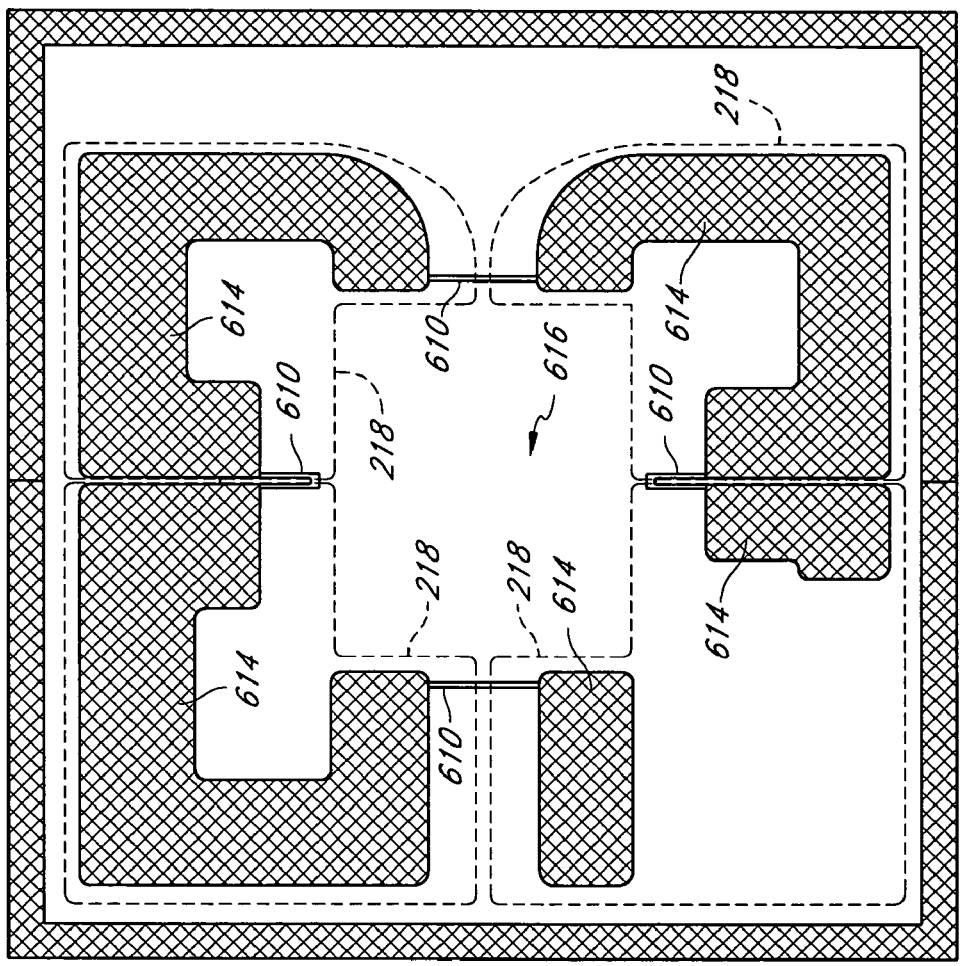
Figure 6C:
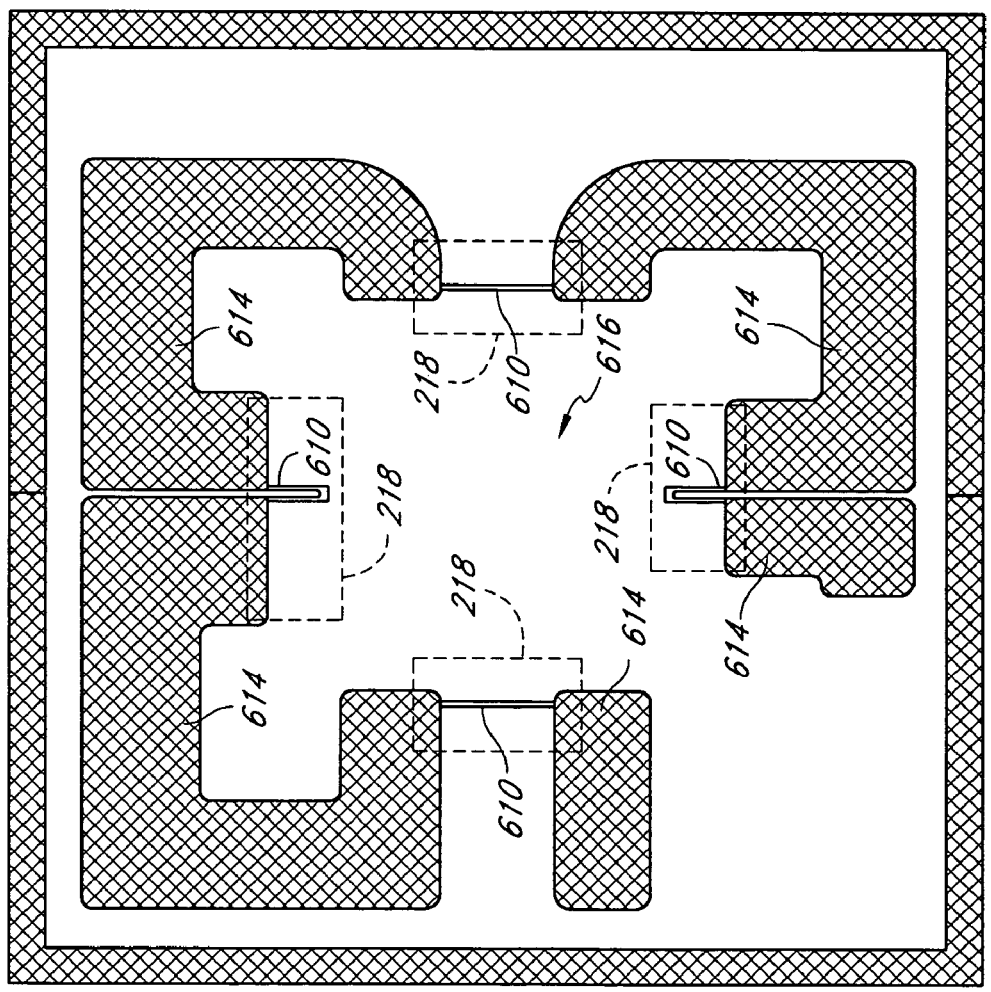

For example, FIGS. 6A-6C are schematic drawings illustrating a top view of an exemplary device layer 214 in relation to various configurations of the shield layer 218. As schematically illustrated in FIGS. 6A-6C, in certain embodiments, the device layer 214 comprises a Wheatstone bridge network including four piezoresistors 610 electrically coupled through conductive lines 614. Although not shown in FIGS. 6A-6C, the diaphragm 223 is located relative to a central region of the device layer 214 such that the piezoresistors 610 are positioned near an edge of the diaphragm 223.

As schematically shown in FIG. 6A, in certain embodiments, the shield layer 218 is substantially contiguous and is positioned so as to substantially cover the piezoresistors 610 and the conductive lines 614. As schematically illustrated in FIGS. 2A and 2B, in certain such embodiments, portions of the shield layer 218 may be spaced from the first interconnect stack 230 in regions 219 to provide electrical isolation from the first interconnect stack 230.

As schematically illustrated in FIG. 6B, in certain other embodiments, the shield layer 218 comprises four sections configured, sized and positioned so as to cover the piezoresistors 610 and the conductive lines 614 without substantially covering the central portion 616 of the device layer 214. As schematically illustrated in FIG. 6C, in certain other embodiments, the shield layer 218 comprises four sections configured, sized and positioned so as to substantially cover the piezoresistors 610 without substantially covering the conductive lines 614 or the central region 616 of the device layer 214. The exemplary shield layers 218 schematically illustrated in FIGS. 6B and 6C comprise less material than the exemplary embodiment schematically illustrated in FIG. 6A and may, therefore, allow increased flexibility of the diaphragm 223 and sensitivity of the pressure sensor 200.

The shield layer 218 is electrically coupled to the conductive substrate 210 through the electrical conduit 220. In certain embodiments, the electrical conduit 220 comprises a hole through the insulative layer 216 and through the buried oxide layer 212 to the conductive substrate 210. The electrical conduit 220 of certain embodiments is insulated from the device layer 214 by the insulative layer 216 and the buried oxide layer 212. The electrical conduit 220 can comprise any material that is sufficiently conductive. In certain embodiments, the electrical conduit 220 comprises the same material as the shield layer 218. Forming the electrical conduit 220 and the shield layer 218 from the same material reduces contact junction effects such as contact resistance, phase changes, thermal expansion mismatches, cracking, and other defects. However, in certain other embodiments, the electrical conduit 220 comprises a material that is different than the shield layer 218. In certain such embodiments, for example, the shield layer 218 comprises doped polysilicon and the electrical conduit 220 comprises titanium-tungsten alloy.

In certain embodiments, the electrical conduit 220 contacts the conductive substrate 210 or penetrates into the conductive substrate 210, as schematically shown in FIGS. 2A and 2B. Certain embodiments in which the electrical contact 220 penetrates the conductive substrate 210 advantageously improve the contact reliability between the electrical conduit 220 and the conductive substrate 210. Thus, in certain such embodiments, the electrical conduit 220 electrically couples the conductive substrate 210 and the shield layer 218, and brings the conductive substrate 210 and the shield layer 218 to substantially the same electric potential. In certain such embodiments, having the conductive substrate 210 and the shield layer 218 at substantially the same electric potential advantageously provides a planarized and substantial electric field density in the region of the flexure-responsive elements in the device layer 214, thereby protecting the device layer 214 from stray fields and distributing charges on the surface of the conductive substrate 210 and the shield layer 218 evenly. Thus, certain such embodiments advantageously reduce the drift currents in the device layer 214.

In certain embodiments, the shield layer 218 is electrically coupled to an input of the device layer 214 through the interconnect stack 230. During operation of the pressure sensor 200 in certain embodiments, the device layer 214 is powered by an input voltage through the interconnect stack 230. Thus, the input voltage is also provided to both the shield layer 218 and the conductive substrate 210. In certain embodiments, one or more external signals (e.g., power, ground, sensor output, or the like) in addition to the input voltage are coupled to the pressure sensor 200. In certain such embodiments, the input voltage provided to the shield layer 218 and the conductive substrate 210 has a larger magnitude than the magnitudes of the other voltages coupled to the pressure sensor 200. In certain other embodiments, the shield layer 218 and the conductive substrate 210 are electrically isolated from the device layer 214 and are electrically coupled to the one or more external signals. For example, in certain embodiments the shield layer 218 and the conductive substrate 210 are coupled to ground.

As discussed above, applying an input voltage to the shield layer 218 and the conductive substrate 210 in certain embodiments repels and/or discharges negative and positive dipoles in the environment surrounding the pressure sensor 200. In certain embodiments, the voltage applied to the shield layer 218 advantageously reduces the buildup of electrostatic potential in a medium surrounding the pressure sensor 200 by allowing charges to flow into a system power source (not shown) supplying the input voltage. Further, in certain embodiments, the electrical connection between the conductive substrate 210 and the shield layer 218 through the electrical conduit 220 advantageously reduces the buildup of static potential in the conductive substrate 210. Thus, certain embodiments described herein advantageously reduce one or both of these potential sources of drift current.

The shield layer 218 of certain embodiments, an example of which is schematically illustrated by FIG. 2A, is exposed to the environment or a medium surrounding the pressure sensor 200 so as to absorb and/or repel charges, as discussed above. However, charge leakage between the shield layer 218 and the flexure-responsive elements in the device layer 218 can affect the performance of the flexure-responsive elements. Thus, as schematically shown in FIG. 2B, the shield layer 214 of certain embodiments is covered with a protective layer 240 comprising a dielectric material or non-oxidizing passivation material. Exemplary dielectric materials for the protective layer 240 include, but are not limited to, silicon dioxide, doped silicon dioxide, silicon monoxide, silicon nitride, silicon oxynitride, aluminum silicon oxynitride, fused quartz, silicon carbide, alumina, boron nitride, low-k dielectrics, tantalum oxide and other high-k dielectrics, fluorocarbon polymer, plastic, ceramic, glass, or other ceramic dielectrics or polymeric dielectrics. Exemplary non-oxidizing passivation materials for the protective layer 240 include, but are not limited to, titanium nitride, tantalum nitride, other metal nitrides, or non-oxidizing materials. In certain embodiments, the thickness of the protective layer 240 is in a range between approximately 100 angstroms and approximately 1000 angstroms.

In operation, the pressure sensor 200 of certain embodiments measures a force applied to a first side of the pressure sensor 200 (e.g., to the shield layer 218 or the protective layer 240 discussed above). In other embodiments, the pressure sensor 200 measures force applied to a second side of the pressure sensor 200 (i.e., to the conductive substrate 210), and in still other embodiments, the pressure sensor 200 measures a pressure differential between the first side and the second side. For example, in certain embodiments a first pressure is applied to the shield layer 218 (or protective layer 240) and a second pressure is applied to the conductive substrate 210. When the first pressure and the second pressure are not equal to one another, the pressure sensor 200 flexes in response to the differential pressure, and provides an electrical signal indicative of the differential pressure.

As discussed below, in certain embodiments the pressure sensor 200 measures the first pressure relative to a known or predetermined value for the second pressure. For example, in certain such embodiments, the cut-out region 222 of the conductive substrate 210 is fluidly coupled to a volume having a pressure of approximately zero (e.g., the second pressure is a vacuum pressure). Thus, the first pressure is measured relative to the vacuum pressure applied to the diaphragm 230 from the cut-out region 222. In certain other embodiments, the pressure sensor 200 is configured to measure relative changes to both the first pressure and the second pressure. For example, in certain such embodiments the shield layer 218 (or protective layer 240) is fluidly coupled to a volume of a system such as an engine or fuel tank having the first pressure, and the conductive substrate 210 is fluidly coupled to the surrounding environment having the second pressure. In other certain such embodiments, for example, the shield layer 218 (or protective layer 240) is fluidly coupled to a first system having the first pressure, and the conductive substrate 210 is coupled to a second system having the second pressure.

Figure 3A:
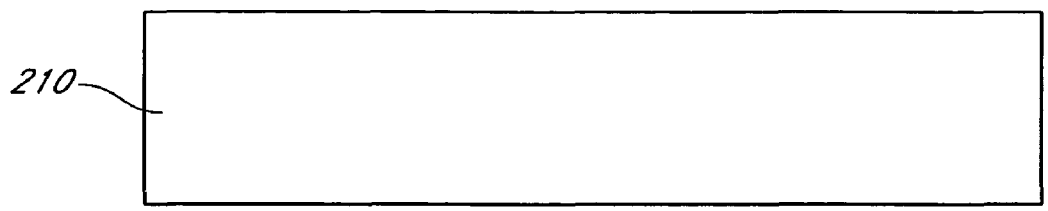
FIGS. 3A-3I are schematic cross-sectional views illustrating methods of forming the pressure sensor shown in FIGS. 2A and 2B according to certain embodiments of the invention described herein.
Figure 3B:
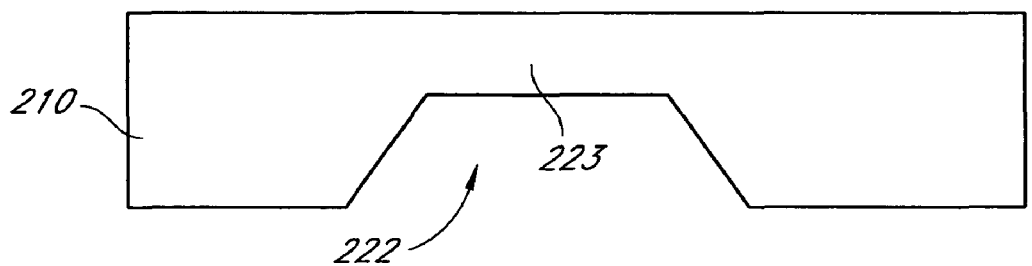

FIGS. 3A-3I are schematic cross-sectional views illustrating an exemplary method of forming the pressure sensor 200 schematically illustrated by FIG. 2B according to certain embodiments described herein. While FIGS. 3A-3I show various steps of a method of fabrication in a particular order, artisans skilled in the art recognize that other steps or other sequences of steps are also compatible with embodiments described herein. As schematically illustrated by FIG. 3A, the method comprises providing the conductive substrate 210. As discussed above, in certain embodiments the conductive substrate 210 comprises p-type or n-type doped silicon. As schematically illustrated by FIG. 3B, the conductive substrate 210 of certain embodiments is processed to produce the cut-out region 222. In certain embodiments, the conductive substrate 210 is processed to form the cut-out region 222 by chemically etching, micromachining. mechanically milling or other suitable fabrication techniques. The remaining portion of the conductive substrate 210 over the cut-out region 222 defines the flexible diaphragm 223. In certain embodiments, the conductive substrate 210 becomes very brittle after being processed to form the cut-out region 222. Thus, in certain such embodiments, the cut-out region 222 is formed at or near the end of the fabrication process. However, an artisan will recognize from the disclosure herein that the cut-out region 222 can be formed at any point during the process.

Figure 3C:
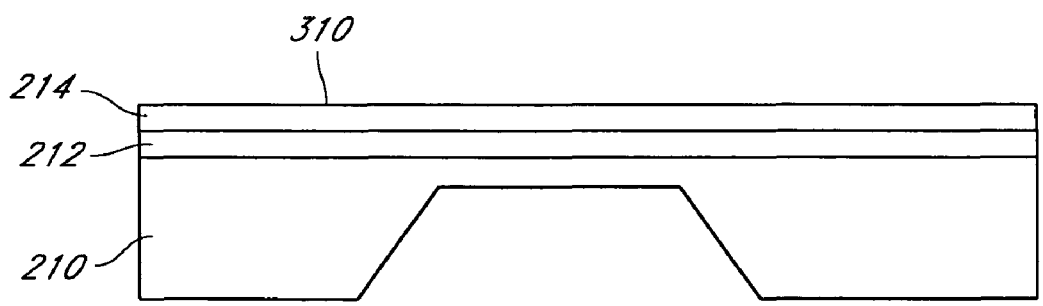

As schematically illustrated in FIG. 3C, in certain embodiments the buried oxide layer 212 is formed below a top surface 310 of the conductive substrate 210. In certain such embodiments, the buried oxide layer 212 is fabricated using a separation by implantation of oxygen (SIMOX) technique wherein oxygen ions with predetermined energies are implanted into the conductive substrate 210 to form the buried oxide layer 212 at a predetermined depth below the top surface 310 of the conductive substrate 210. As discussed above, in certain other embodiments, the buried oxide layer 212 is formed by bonding (e.g., using fusion, anodic bonding, or other bonding procedures known in the art) a pre-oxidized substrate to the conductive substrate 210 and then removing excess material from the pre-oxidized substrate by an ion delamination process or by polishing, etching or cutting away the excess material. Examples using ion delamination process are provided in U.S. Pat. No. 6,372,609, which is incorporated herein by reference.

The active layer 214 of certain embodiments is then formed over the buried oxide layer 212. In certain such embodiments, the circuit elements of the device layer 214 are formed by doping selected portions of the device layer 214 between the top surface 310 of the conductive substrate 210 and the buried oxide layer 212. The distance between the top surface 310 of the conductive substrate 210 and the buried oxide layer 212 is selected in certain embodiments to define certain characteristics of the flexure-responsive elements formed in the device layer 214. For example, the resistivity of piezoresistors formed in the device layer 214 is defined, at least in part, by the thickness of the piezoresistors. This thickness is typically determined in prior art processes by the depth of the doped region of a device portion of a substrate. However, the thickness of the piezoresistors formed by doping the device layer 214 in certain embodiments is precisely defined by doping the selected portions of the device layer 214 from the top surface 310 of the conductive substrate 210 to the buried oxide layer 212. In this way, the buried oxide layer 212 advantageously limits the thickness of the piezoresistors, thereby making the piezoresistor thickness more precise.

In certain embodiments, the device layer 214 is doped by diffusing dopants into selected portions of the device layer 214 to produce circuit elements having a desired resistivity. Exemplary dopants include, but are not limited to, boron, phosphorous, arsenic, or the like. Exemplary doping processes include, but are not limited to, ion implantation of a dose of approximately $3 \times 10^{15}$ and $5 \times 10^{15}$ ions/cm$^2$, liquid source diffusion and solid source diffusion. In certain embodiments, the dopant concentration is in a range between approximately $1 \times 10^{12}$ atoms/cm$^3$ and approximately $1 \times 10^{21}$ atoms/cm$^3$ depending on factors such as the particular circuitry formed in the device layer 214 and the desired sensitivity of the sensor 200. After injecting dopants into the device layer 214, the device layer 214 of certain embodiments is annealed to reach a desired resistivity and to uniformly diffuse and distribute the dopant through the device layer 214.

Figure 3D:
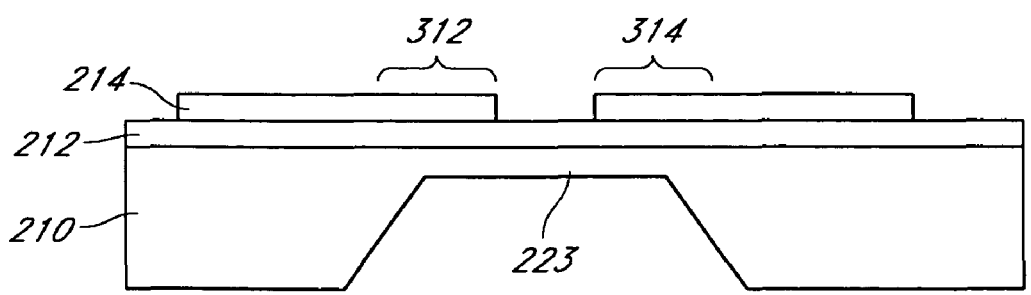

As schematically illustrated in FIG. 3D, the device layer 214 of certain embodiments is then photoetched to define conductive paths, flexure-responsive elements, and/or other circuitry such as diodes, bipolar or MOSFET transistors, resistors, capacitors, potentiometers, thermistors, thermocouples, and interconnects. For example, the device layer 214 in certain embodiments is sufficiently doped and etched such that a first region 312 and a second region 314 of the device layer 214 comprise flexure-responsive elements extending over the diaphragm 223 so as to be responsive to flexing of the diaphragm 223. Exemplary circuitry in the device layer 214 of certain embodiments includes thermal monitoring circuitry, linearity compensation circuitry, zero compensation circuitry, amplification circuitry, drift detection circuitry, and the like.

In certain embodiments, the device layer 214 comprises a combination of silicon piezoresistors and deposited metal conductors that connect the piezoresistors to one another and to input/output pads in a Wheatstone bridge configuration. In certain such embodiments, the device layer 214 has a thickness in a range from a few hundred angstroms to a few microns, and may comprise regions which are n-type doped or p-type doped with a suitable dopant. For example, boron may be used as a dopant for a device layer 214 comprising p-type silicon. Alternatively, phosphorous or arsenic may be used, for example, as the dopant for a device layer 214 comprising n-type silicon.

While, as discussed above in relation to FIGS. 3A-3D, the buried oxide layer 212 and the device layer 214 can be formed below the top surface 310 of the conductive substrate 210, an artisan will recognize from the disclosure herein that other methods can be used to form the buried oxide layer 212 and the device layer 214. For example, in certain embodiments the device layer 214 is anodically bonded to the buried oxide layer 212. In other embodiments the device layer 214 is deposited or epitaxially grown on the surface of the buried oxide layer 212. For example, the device layer 214 may be formed using thermal growing techniques or conventional deposition processes such as chemical vapor deposition (CVD), sputtering, electroplating, spray-on techniques, or spin-on techniques. Further, an artisan will recognize from the disclosure herein that doping can be achieved in-situ during such bonding or deposition processes.

Figure 3E:
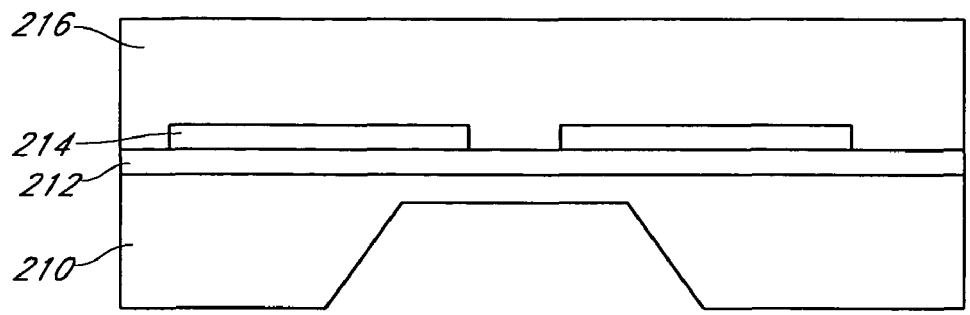

As schematically illustrated in FIG. 3E, the insulative layer 216 of certain embodiments is then deposited over the device layer 214 and the buried oxide layer 212. Exemplary deposition methods include, but are not limited to, plasma enhancement methods such as chemical vapor deposition (CVD), physical vapor deposition (PVD), or the like. In certain embodiments, the insulative layer 216 is anodically bonded to the device layer 214 and the buried oxide layer 212. In other embodiments the insulative layer 216 is deposited or thermally grown on the surface of the device layer 214 and the buried oxide layer 212.

Figure 3F:
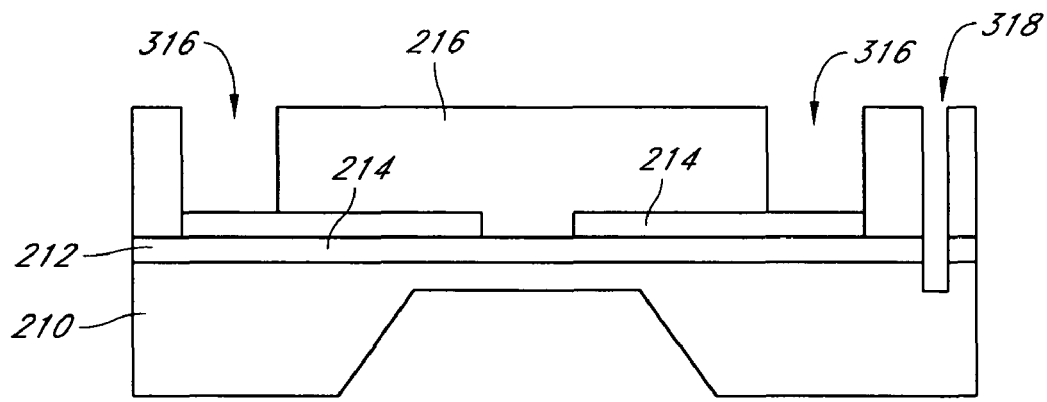

As schematically illustrated in FIG. 3F, in certain embodiments the insulative layer 216 is formed with interconnect holes 316 for the interconnect stacks 230, 231 and a conduit hole 318 for the electrical conduit 220. In other embodiments, one or more of the interconnect holes 316 and the conduit hole 318 are wet etched, plasma etched, or dry etched to devise suitable topographies for subsequent metallization. In certain such embodiments, one or more of the interconnect holes 316 and the conduit hole 318 are wet etched to provide sidewalls with a positive slope that permits the deposition of titanium-tungsten alloy film or other conductive film without overhang, keyholing, or other deposition artifacts.

The interconnect holes 316 of certain embodiments are etched through the insulative layer 216 to the device layer 214. In certain such embodiments, the first conductive film 232 of the interconnect stacks 230, 231 is then deposited into the interconnect holes 316 and onto respective contact pads formed on the device layer 214.

Figure 3G:
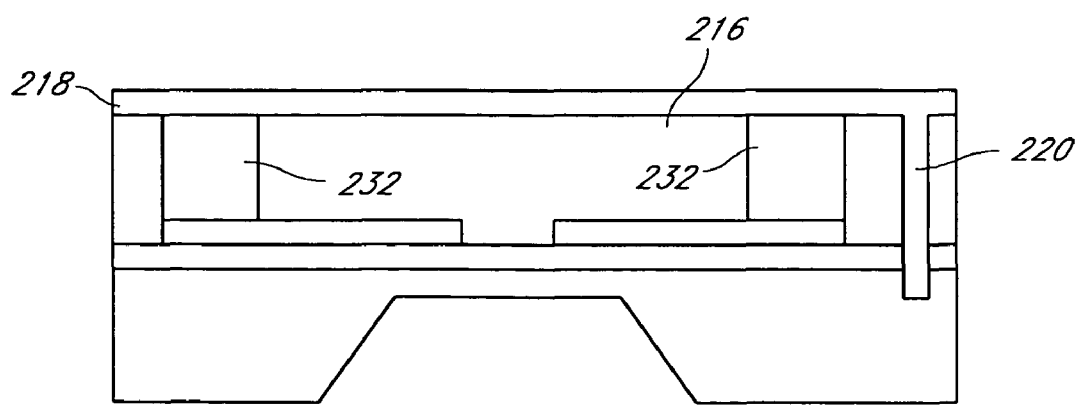

The conduit hole 318 of certain embodiments is etched through the insulative layer 216 and the buried oxide layer 212. In certain such embodiments, the conduit hole 318 is etched into a portion of the conductive substrate 210 so as to increase the surface area of the interface between the electrical conduit 220 and the conductive substrate 210. In certain such embodiments, the conduit hole 318 is then metallized to form the electrical conduit 220, as shown in FIG. 3G. In certain other embodiments, rather than etching the conduit hole 318 as shown in FIG. 3F, the electrical conduit 220 is formed along an outer edge of the shield layer 218, the insulative layer 216, the buried oxide layer 212, and the conductive substrate 210. In other certain such embodiments, the shield layer 218 and the conductive substrate 210 are electrically coupled through external circuitry.

As schematically illustrated in FIG. 3G, the shield layer 218 is deposited over the insulative layer 216, the first conductive film 232, and the electrical conduit 220. In certain embodiments, the shield layer 218 is deposited using a variety of techniques including, for example, CVD, PVD, other plasma enhancement methods, or combinations thereof. In certain other embodiments, the shield layer 218 is anodically bonded to the insulative layer 216, the first conductive film 232, and the electrical conduit 220. As discussed above, in certain embodiments the material deposited in the conduit hole 318 to form the electrical conduit 220 comprises the same material which forms the shield layer 218.

Figure 3H:
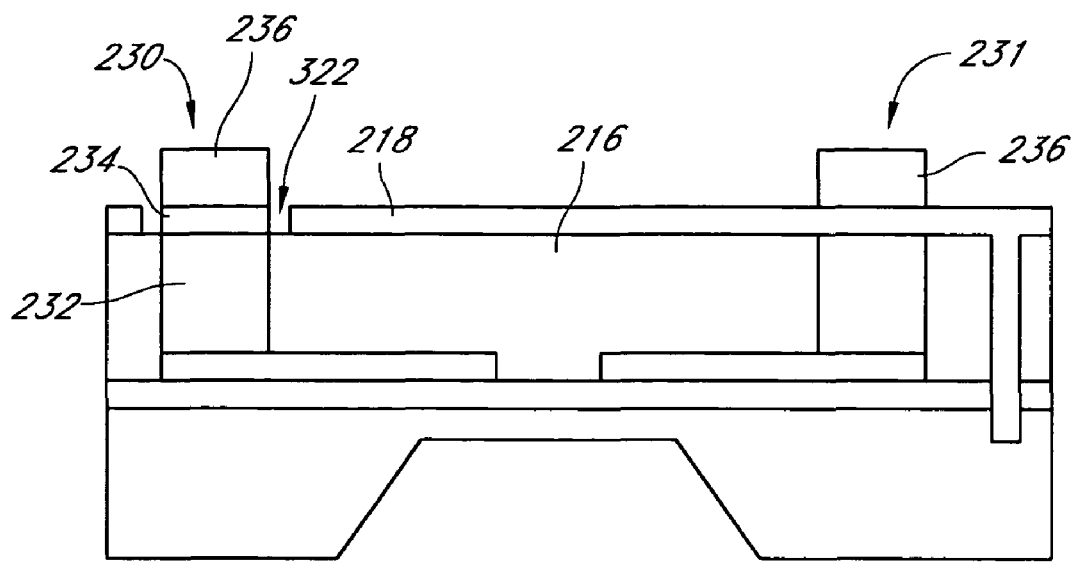

As schematically illustrated in FIG. 3H, in certain embodiments a portion of the shield layer 218 forms the second conductive film 234 of the respective interconnect stacks 230, 231. In certain such embodiments, the third conductive film 236 is deposited on the second conductive film 234 to form the interconnect stacks 230, 231. In certain embodiments, the shield layer 218 is etched from a region 322 around the first interconnect stack 230 to isolate the first interconnect stack 230 from the shield layer 218. Although not shown, in certain embodiments the shield layer 218 is also etched around the second interconnect stack 231 to isolate the second interconnect stack 231 from the shield layer 218. In certain such embodiments, the shield layer 218 and the conductive substrate 210 are electrically coupled to an external voltage through a contact (not shown).

Figure 3I:
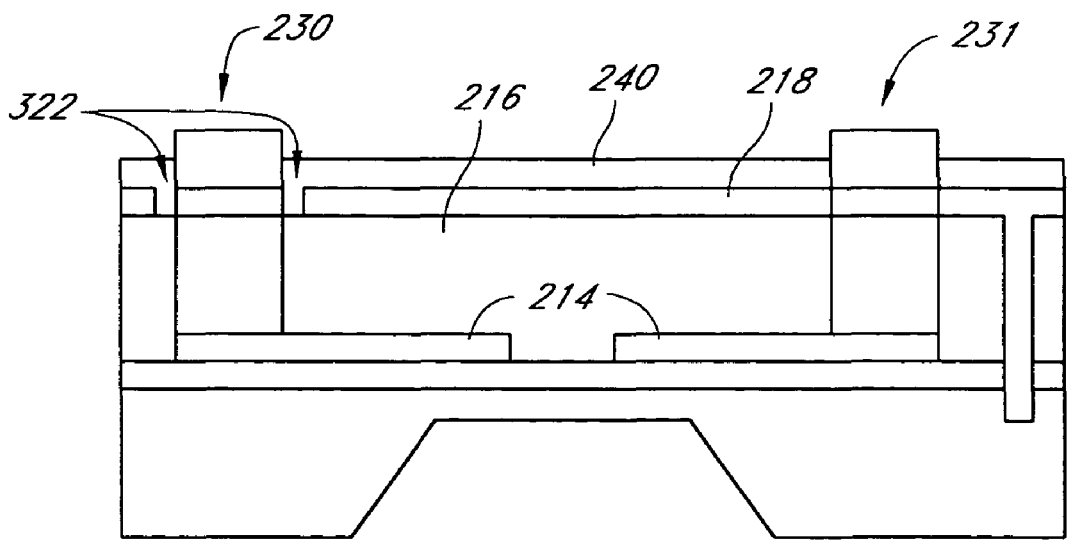

As schematically illustrated in FIG. 3I, in certain embodiments, the protective layer 240 is deposited over the shield layer 218. In certain embodiments, the protective layer 240 is anodically bonded to the shield layer 218. In other embodiments the protective layer 240 is epitaxially grown on the surface of the shield layer 218. In certain embodiments, the protective layer 240 is also deposited in the etched region 322 of the shield layer 218 around the first interconnect stack 230. Advantageously, the interconnect stacks 230, 231 of certain embodiments extend through the protective layer 240 to provide external electrical connections to the device layer 214. In certain embodiments, an opening (not shown) is etched in the protective layer 240 to provide access to the external environment for an electrical connection while maintaining protection of the shield layer 218.

Figure 4A:
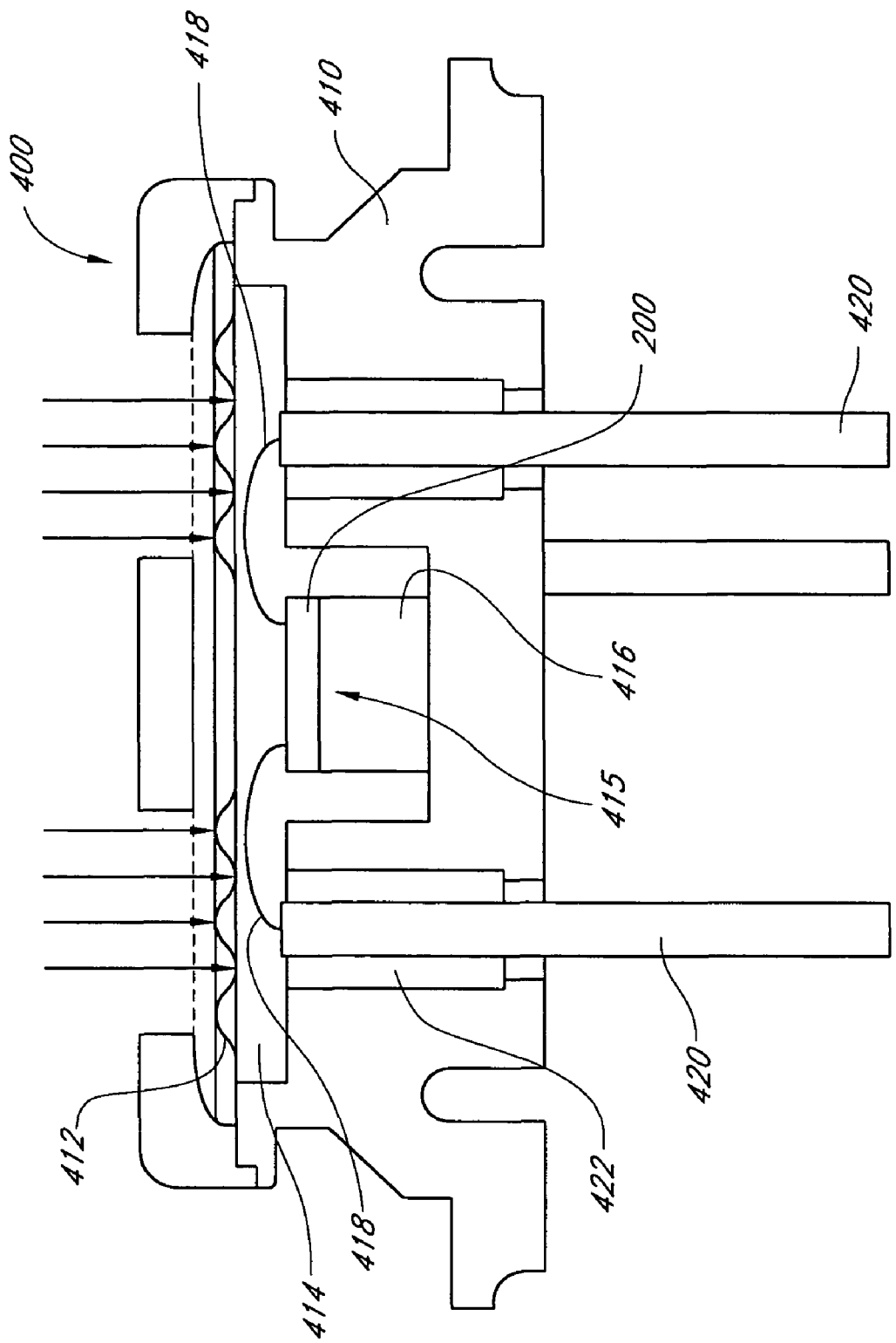
FIGS. 4A and 4B is a cross-sectional diagram of sensor systems for measuring pressure according to certain embodiments of the invention described herein.
Figure 4B:
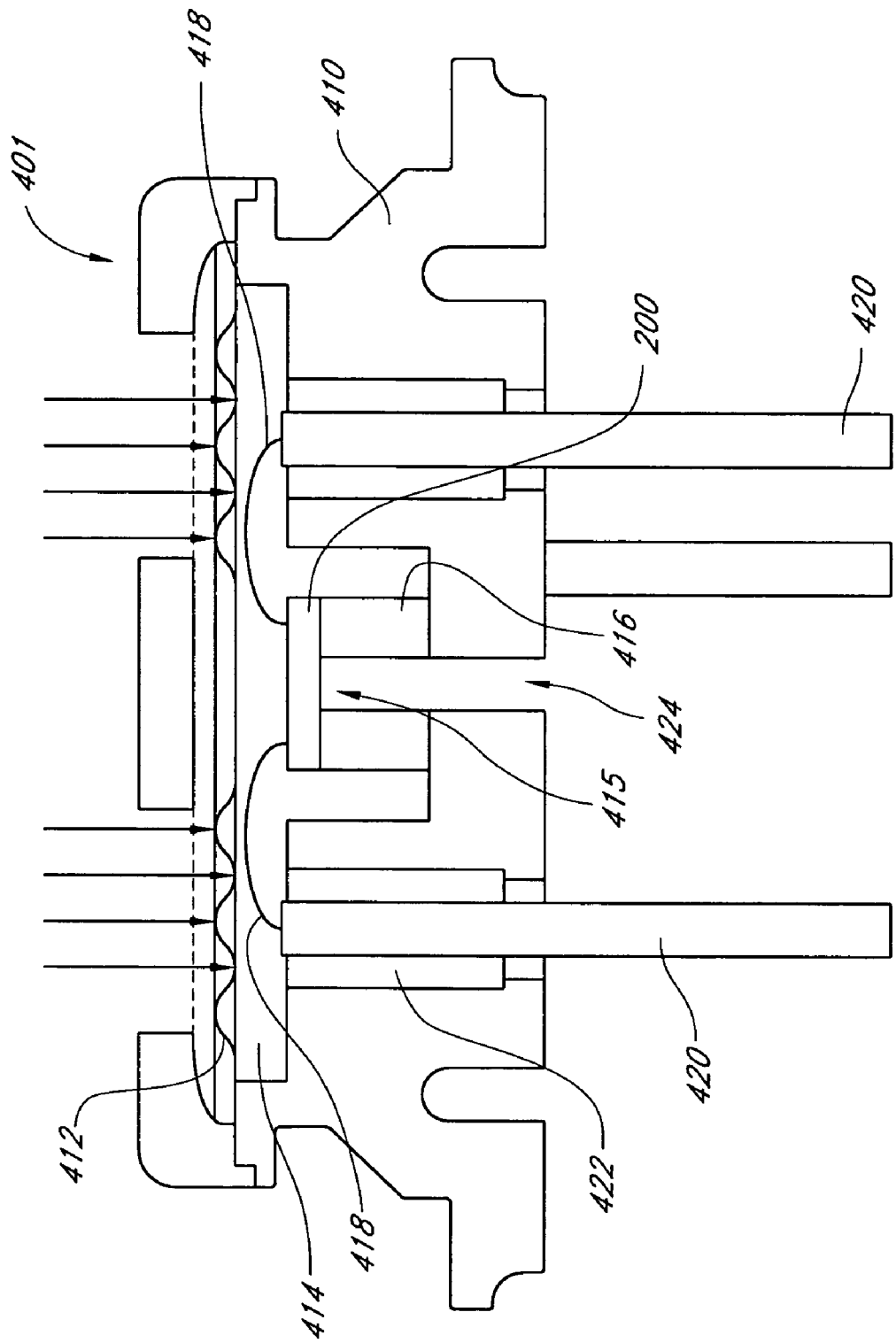

FIGS. 4A and 4B are cross-sectional diagrams of sensor systems 400, 401 for measuring pressure according to certain embodiments described herein. The sensor systems 400, 401 include a housing 410 comprising a flexible housing surface 412 exposed to system pressure (shown as arrows in FIGS. 4A and 4B) outside the housing 410 on one side and a reservoir 414 comprising a liquid dielectric material (e.g., silicone oil) on the other side within the housing 410. The sensor systems 400, 401 comprise a pressure sensor 200, such as the pressure sensor 200 schematically shown in FIG. 2A, the pressure sensor 200 has a first side coupled to the reservoir 414 and a second side coupled to a second region 415 at a second pressure. The pressure sensor 200 is responsive to a pressure differential between the reservoir 414 and the second region 415.

In certain embodiments, the pressure sensor 200 is coupled to a pedestal 416 which provides structural support for the pressure sensor 200. In certain embodiments, the pedestal 416 comprises an electrically insulative material. Exemplary electrically insulative materials for the pedestal include glass, borosilicate glass, fused quartz, silicon nitride, boron nitride, silicon carbide, alumina, silicon aluminum oxynitride, silicon, and other dielectric materials. In certain such embodiments, the pedestal 416 insulates the pressure sensor 200 from the housing 410.

In certain embodiments, the sensor systems 400, 401 are used in an engine, a fuel tank or other harsh environments that could damage the pressure sensor 200. In certain such embodiments, the reservoir 414 comprises a dielectric liquid such as a silicone-based oil or the like. In certain exemplary embodiments, the dielectric liquid comprises CSM-7400-1 silicone oil commercially available from Nusil Technology of Carpinteria, Calif. The dielectric liquid protects the pressure sensor 200 from potential mechanical damage and/or potential chemical damage caused by the hostile system environment external to the housing 410.

However, as discussed above, in certain embodiments the dielectric liquid also exhibits a dipole moment when heated, which can cause drift currents in the device layer 214 of the pressure sensor 200, thereby introducing errors into the pressure measurements of the sensor systems 400, 401. As discussed above in relation to FIGS. 2A and 2B, the pressure sensor 200 of certain embodiments advantageously comprises a shield layer 218 above the device layer 214 electrically coupled to a conductive substrate 210 below the device layer 214 to protect the device layer 214 from stray electromagnetic or electrostatic fields. In certain embodiments in which the shield layer 218 and the conductive substrate 210 are at a fixed and equal potential, the shield layer 218 and the conductive substrate 210 absorb and/or repels charges in the dielectric liquid in the reservoir 414, reducing drift currents in the device layer 214. As a result, the accuracy of pressure measurements using the sensor systems 400, 401 is increased.

In certain embodiments, the pressure sensor 200 is electrically coupled to bond wires 418 and pins 420 that extend out of the housing 410 and that provide external electrical connections to the pressure sensor 200. In certain embodiments, the bond wires 418 and pins 420 comprise gold. In other embodiments, the bond wires 418 and pins 420 comprise other conductive materials suitable for electrical connectors such as aluminum or the like. A dielectric material 422 electrically isolates the pins from the housing 410. Exemplary dielectric materials 422 include glass, borosilicate glass, high temperature glass, fused quartz, silicon nitride, boron nitride, silicon carbide, alumina, silicon aluminum oxynitride, silicon, and other dielectric materials. In certain embodiments, at least some of the pins 420 are coupled to an input voltage which powers the pressure sensor 200. In certain embodiments, at least some of the pins 420 are coupled to an output voltage generated by the pressure sensor 200 indicative of changes in the system pressure.

As the system pressure exerts a force on the reservoir 414, the force is transferred to the first side of the pressure sensor 200. The resulting pressure differential with the second side of the pressure sensor 200 causes the diaphragm 223 to flex. As schematically illustrated in FIG. 4A, in certain embodiments the second side of the pressure sensor 200 is fluidly coupled to the second region 415 at the second pressure having a known or predetermined value.

Figure 5A:
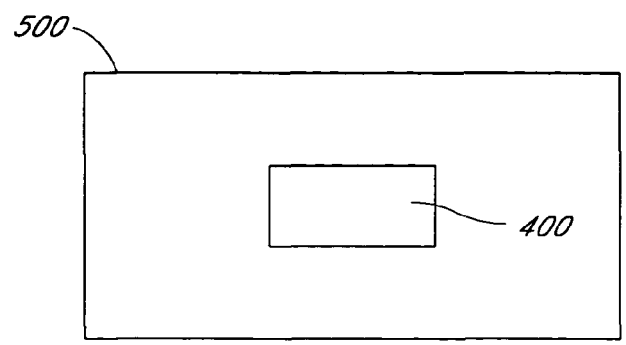
FIG. 5A is a block diagram of the sensor system shown in FIG. 4A configured to measure a pressure within an enclosed system according to certain embodiments of the invention described herein.

In certain such embodiments, the second region 415 is fluidly coupled to a substantial vacuum such that there is approximately zero pressure within the cut-out region 222 of the conductive substrate 210 schematically shown in FIGS. 2A and 2B. Thus, the sensor system 400 measures the force exerted on the first side of the pressure sensor 200 relative to the substantial vacuum in the cut-out region 222. For example, FIG. 5A is a block diagram of the sensor system 400 configured to measure a pressure within an enclosed system 500 according to certain embodiments of the invention described herein. The system 500 of certain embodiments comprises an engine, a fuel tank, or other harsh environment. The sensor system 400 measures the pressure within the system 500 relative to the substantial vacuum fluidly coupled to the second region 415.

As schematically illustrated in FIG. 4B, in certain embodiments the housing 410 also comprises a differential pressure port 424 that extends through the housing 410 and the pedestal 416 to provide a pressure to the second side of the pressure sensor 200. A difference in pressures exerted on the pressure sensor 200 from a first system through the reservoir 414 to the first side of the pressure sensor 200 and from a second system through the differential pressure port 424 to the second side of the pressure sensor 200 flexes the diaphragm 223 of the pressure sensor 200. Thus, the sensor system 401 schematically illustrated in FIG. 4B measures a difference in pressures between the two systems.

Figure 5B:
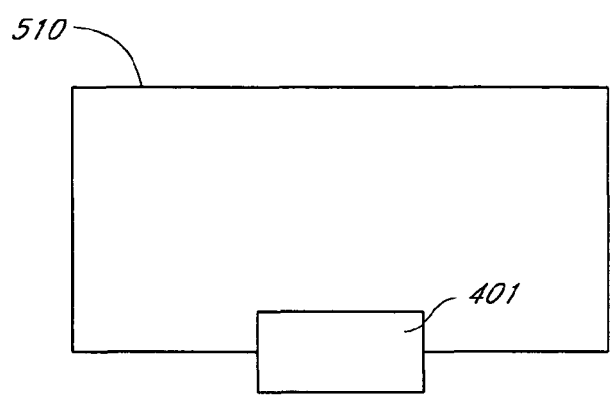
FIG. 5B is a block diagram of the sensor system shown in FIG. 4B configured to measure a pressure differential between an enclosed system and the surrounding environment according to certain embodiments of the invention described herein.

For example, FIG. 5B is a block diagram of the sensor system 401 configured to measure a pressure differential between an enclosed system 510 and the surrounding environment according to certain embodiments described herein. In certain such embodiments, the first side of the pressure sensor 200 is coupled to the pressure within the system 510 and the second side of the pressure sensor 200 is coupled to an environment surrounding the system 510 through the differential pressure port 424. Advantageously, the sensor system 401 of certain such embodiments measures the pressure differential as the pressure within the system 510 changes, as the pressure outside of the system 510 changes, or as both pressures change.

Figure 5C:
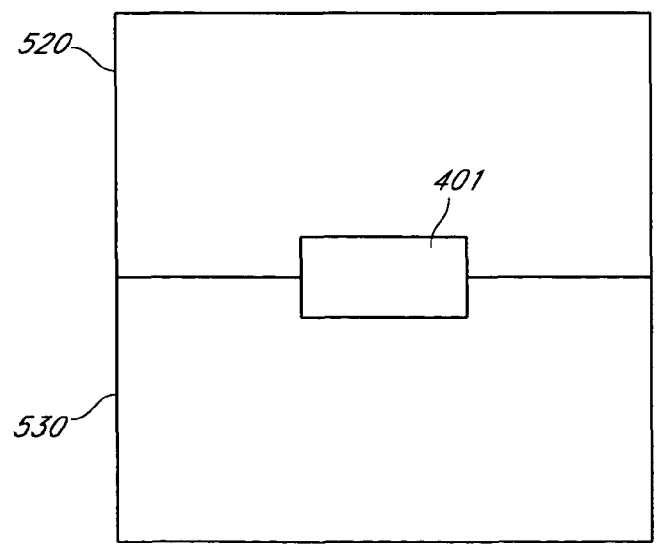
FIG. 5C is a block diagram of the sensor system shown in FIG. 4B configured to measure a pressure differential between a first enclosed system and a second enclosed system according to certain embodiments of the invention described herein.

As another example, FIG. 5C is a block diagram of the sensor system 401 configured to measure a pressure differential between a first enclosed system 520 and a second enclosed system 530 according to certain embodiments described herein. In certain such embodiments, the first side of the pressure sensor 200 is coupled to the pressure within the first system 520 and the second side of the pressure sensor 200 is coupled to the pressure within the second system 530 through the differential pressure port 424. Advantageously, the sensor system 401 of certain such embodiments measures the pressure differential as the pressure within the first system 520 changes, as the pressure within the second system 530 changes, or as both pressures change.

While certain embodiments have been described herein, these embodiments have been presented by way of example only, and are not intended to limit the scope of the appended claims. Indeed, the novel methods and systems described herein may be embodied in a variety of other forms; furthermore, various omissions, substitutions and changes in the form of the methods and systems described herein may be made without departing from the spirit of the systems and methods recited by the appended claims and their equivalents.

What is claimed is:

1. An electronic device comprising:
    a conductive substrate including a cut-out region fluidly coupled to a substantial vacuum having a pressure of approximately zero;
    a first insulative layer over at least a portion of the substrate;
    a device layer over the first insulative layer, the device layer comprising a plurality of electrically conductive elements including a plurality of resistive elements electrically coupled together through conductive lines, the electrically conductive elements forming a resistive network;
    a second insulative layer over the device layer; and
    a conductive shield layer over the second insulative layer, the shield layer electrically coupled to the substrate.

2. The electronic device of claim 1, wherein the conductive substrate comprises a doped semiconductor material.

3. The electronic device of claim 2, wherein the doped semiconductor material comprises silicon.

4. The electronic device of claim 1, wherein the first insulative layer comprises a dielectric layer.

5. The electronic device of claim 4, wherein the dielectric layer is below a top surface of the substrate.

6. The electronic device of claim 1, wherein the shield layer is over a substantial portion of the electrically conductive elements.

7. The electronic device of claim 1, wherein the second insulative layer comprises a dielectric layer.

8. The electronic device of claim 1, wherein the shield layer comprises a metallic layer or a conductive semiconductor layer.

9. The electronic device of claim 1, wherein the device layer is electrically coupled to the substrate and the shield layer.

10. The electronic device of claim 9, wherein the device layer has a voltage applied thereto, and the substrate and the shield layer each have the voltage applied thereto.

11. The electronic device of claim 1, further comprising:
    a first voltage electrically coupled to the device layer; and
    a second voltage electrically coupled to the substrate and the shield layer.

12. The electronic device of claim 1, wherein the resistive network comprises a Wheatstone bridge.

13. The electronic device of claim 1, wherein the shield layer comprises a plurality of sections.

14. The electronic device of claim 13, wherein the plurality of sections are sized and positioned so as to cover the resistive elements without covering the entire device layer.

15. The electronic device of claim 11, wherein the second voltage comprises ground potential.

* * * * *